US011219034B1

(12) United States Patent
Dunsmore et al.

(10) Patent No.: US 11,219,034 B1
(45) Date of Patent: Jan. 4, 2022

(54) DISTRIBUTED NETWORK CONNECTIVITY MONITORING OF PROVIDER NETWORK EDGE LOCATION RESOURCES FROM CELLULAR NETWORKS

(71) Applicant: Amazon Technologies, Inc., Seattle, WA (US)

(72) Inventors: Devlin Roarke Dunsmore, Bothell, WA (US); Diwakar Gupta, Seattle, WA (US); Dougal Stuart Ballantyne, Seattle, WA (US); Sairam Sasank Chundi, Seattle, WA (US); Pragya Agarwal, Seattle, WA (US); Mark Walters, Seattle, WA (US); Aditya Chayapathy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/001,178

(22) Filed: Aug. 24, 2020

(51) Int. Cl.
*H04W 72/08* (2009.01)
*H04W 72/04* (2009.01)
*H04W 24/10* (2009.01)

(52) U.S. Cl.
CPC ......... *H04W 72/085* (2013.01); *H04W 24/10* (2013.01); *H04W 72/048* (2013.01)

(58) Field of Classification Search
CPC ... H04W 72/04; H04W 72/048; H04W 72/08; H04W 72/085; H04W 72/087; H04W 72/10; H04W 24/00; H04W 24/02; H04W 24/06; H04W 24/08; H04W 24/10
See application file for complete search history.

(56) References Cited

U.S. PATENT DOCUMENTS

| 9,276,812 | B1 * | 3/2016 | Nagargadde | ........ H04L 41/5054 |
| 9,444,717 | B1 * | 9/2016 | Aithal | ..................... H04L 43/50 |
| 9,959,146 | B2 * | 5/2018 | Ahuja | ..................... G06F 9/505 |
| 11,012,329 | B2 * | 5/2021 | Ball | ..................... H04L 41/145 |

(Continued)

FOREIGN PATENT DOCUMENTS

EP 3582441 A1 12/2019

OTHER PUBLICATIONS

Taherizadeh, Salman et al.; "Monitoring Self-Adaptive Applications Within Edge Computing Frameworks: a state-of-the-art review"; Journal of Systems & Software; vol. 136, Feb. 1, 2018, 20 pages.

(Continued)

*Primary Examiner* — Siu M Lee

(74) *Attorney, Agent, or Firm* — Nicholson De Vos Webster & Elliott, LLP

(57) ABSTRACT

Techniques for distributed network connectivity monitoring of provider network edge location resources from cellular networks are described. A central service transmits test suites of commands to agents executed by test devices, which can execute the commands to test network characteristics between the test devices and target locations via one or multiple cellular communications networks. Results of the testing are sent back to the central service for processing, and the resultant metrics can be used for intelligent latency-based routing of clients, latency-based placement of resources, and/or performance monitoring of deployed resources.

20 Claims, 14 Drawing Sheets

(56) References Cited

U.S. PATENT DOCUMENTS

| | | | |
|---|---|---|---|
| 2015/0089034 A1* | 3/2015 | Stickle | H04L 41/18 709/223 |
| 2016/0140022 A1* | 5/2016 | Michelsen | G06F 1/00 702/186 |
| 2018/0219760 A1 | 8/2018 | Li et al. | |

OTHER PUBLICATIONS

International Search Report and Written Opinion for PCT/US2021/044206, dated Oct. 27, 2021, 13 pages.

* cited by examiner

DISTRIBUTED NETWORK CONNECTIVITY MONITORING OF PROVIDER NETWORK EDGE LOCATION RESOURCES FROM CELLULAR NETWORKS

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which.

DETAILED DESCRIPTION

Figure 1:
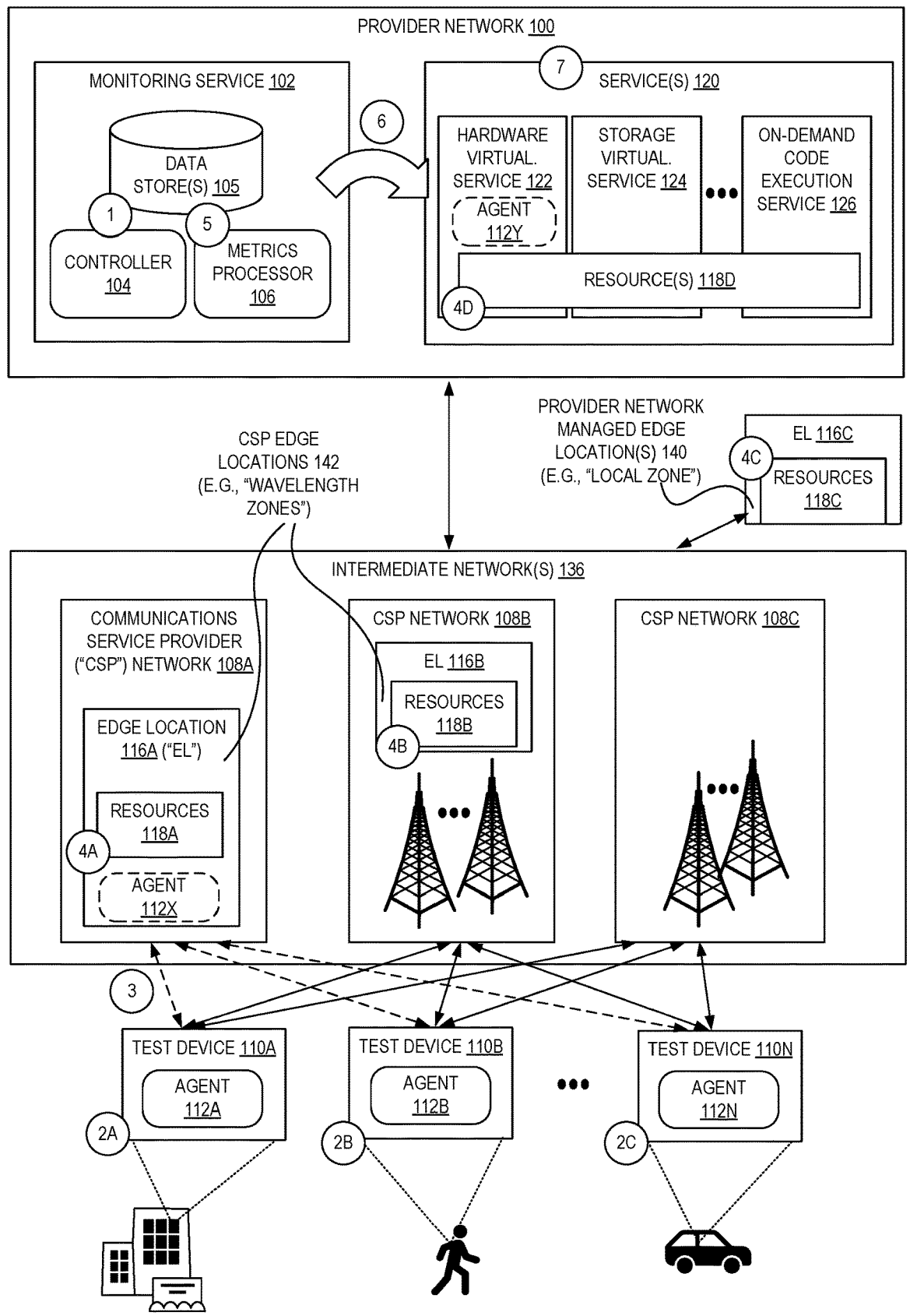
FIG. 1 is a diagram illustrating an environment for distributed network connectivity monitoring of provider network edge location resources from cellular networks according to some embodiments.

The present disclosure relates to methods, apparatus, systems, and non-transitory computer-readable storage media for distributed network connectivity monitoring of provider network edge location resources from cellular networks. According to some embodiments, a monitoring service configures agents executed by various test devices with commands, causing the agents to utilize one or more different networks (optionally including one or multiple different cellular networks) to analyze network connectivity characteristics between the test devices and other resources. These tested resources may be located within a provider network or in an edge location of a provider network, which optionally may be located within a communications service provider network that is distinct from the provider network, where the resources may or may not have general connectivity to the Internet. The agents may measure and generate telemetry/network metrics from these tests, such as latencies between the agents and resources, general availability and/or responsiveness of the resources, network transfer speeds between the agents and the resources, network paths between the agents and the resources, and the like, which may be measured at various points in time and/or from various physical locations, such as when the test device is a mobile device. The agents may provide the raw network metrics (or a processed form based thereupon) back to the monitoring service, which may optionally process the metrics to generate data useful for a variety of purposes, such as determining placement locations for applications according to placement preferences such as latencies to particular groups of end users, routing client traffic to different resource locations based to ensure low-latency access, ensuring network availability and/or sufficient network performance for resources that may potentially only be accessible through a third-party network (e.g., a wired or wireless communications service provider network), etc. Accordingly, embodiments can effectively measure the experience of real-world clients using third-party access networks such as cellular networks when accessing resources hosted or supported by a service provider network.

In some embodiments, cloud provider networks may provide edge locations embedded in communications service provider networks, allowing its users to construct applications with extremely low-latency requirements. However, the precise latencies and overall experience observed by clients connecting to these types of edge locations is not directly visible to the provider network, making it difficult to ensure that these edge locations are sufficiently available and whether they are fulfilling its users' expectations. Embodiments disclosed herein can detect, potentially in near-real time, the actual network performance related characteristics of such deployments, allowing for any issues to be detected and remedied, and/or for traffic to be more intelligently routed between these resources, and/or for new deployments of resources to be intelligently be placed based on actual observed performance-related characteristics.

For example, FIG. 1 is a diagram illustrating an environment for distributed network connectivity monitoring of provider network edge location resources from cellular networks according to some embodiments. In FIG. 1, a monitoring service 102 of a provider network 100 includes a controller 104, a metrics processor 106, and one or more data stores 105. Some or all of monitoring service 102 may be implemented using software executed by one or multiple computing devices across one or multiple locations and may utilize other services 120 of the provider network 100. For example, the controller 104 and/or metrics processor 106 may be implemented as a software application that is executed by one or more compute instances provided by a hardware virtualization service 122 or on-demand code execution service 126, for example, and make use of one or more data stores 105 provided by a storage virtualization service 124 (e.g., providing block-level storage or object storage) or a database service.

The controller 104 may function to provide functionalities ranging from managing test infrastructure, assigning work to testing agents, and providing information pertaining to the state of tests, devices, locations, etc., to other systems or users. As shown at circle (1), the controller 104 may act as coordinator to allow for the configuration of a set of agents to perform testing.

For example, in some embodiments, the controller 104 may manage a registry of agents 112 available for performing testing as well as resources 118 that are to be tested. For example, the monitoring service 102 may provide one or more APIs for the registration of one or both of agents 112 and/or resources 118. As one example, in some embodiments the monitoring service 102 provides a device registration API (e.g., a "RegisterDevice" method) allowing clients to add a new agent 112 (or, test device 110) or in some embodiments a resource to be targeted/tested into the system. Thus, in some embodiments, both an agent and a targeted resource (e.g., a compute instance or other server) may be represented as devices, where the agent has a role of "client" of the service and a targeted resource has a role of "target" of the service. Data associated with the device, e.g., a device type, network address, location, role, etc., may be stored by the controller 104 in the data store(s) 105.

Further at circle (1), the monitoring service 102 may also provide APIs to explicitly define a collection of agents and/or targets referred to as a "node," by sending an API request (e.g., "CreateNode") to define a node including zero, one, or multiple agents and/or targets by providing device identifiers to below to the node, or characteristics of devices that are to be added to the node. A node may thus include a set of agents of a particular type, or a set of agents located in a particular area. A node may similarly include a set of targets of a particular type, etc.

In some embodiments, the monitoring service 102 may provide one or more APIs allowing a client to define a "test suite" of tests to be performed by one or more agents against one or multiple targets. For example, the monitoring service 102 may provide an API (e.g., "CreateTestSuite" method) allowing a client to first generate a test suite (e.g., with example data such as one or more of a test suite identifier, a human-readable name or description, an identifier of an associated user or account) and then an API (e.g., "AddCommandsToTestSuite" or "AddCommandsToDevice" method) allowing the client to define one or more commands to be performed as part of the test suite.

A command may directly or indirectly correspond to a particular test type, program, utility, etc. For example, a command may be to perform a "ping" (e.g., a Transmission Control Protocol (TCP) ping or ICMP echo-based ping technique) test that sends packets of data to a specific network address to determine how long it took to transmit the data and get a response. Thus, a command of "ICMP-PING" used in an API call may correspond to an ICMP ping test, while a command of "TCPPING" may correspond to a TCP ping test, and each command may have zero, one, or more arguments provided therewith.

As another example, a command may be to perform a "traceroute" (e.g., via a traceroute, tracepath, or tracert command available in various operating systems) determine a "path" that packets take from one entity to another, resulting in data such as the hostname of each traversed device, its network address (e.g., IP address), its response time, etc. However, many other types of commands may be implemented in various embodiments, such as a known network tests for determining throughput, packet loss, packet jitter, etc., while running different kinds of workloads (e.g., bidirectional video streaming over different protocols, file transfers, iperf, etc.) over various protocols (e.g., TCP and UDP). For example, the commands could be to send a request to a server to download a file, send a request to upload a file, send a request to stream media, send a request to a server to perform a particular task, or the like. A command could also be to execute a resource, which could be a user-provided resource (e.g., in the form of code, a compiled application, a container, a virtual machine, or the like).

In some embodiments, each command identifies one or more target resources, and thus different commands may have potentially different targets. However, in some embodiments, each command in the test suite is implicitly associated with one or more target resources that are directly associated with an entire test suite; thus, it may be the case that each command is run for each test suite-associated target.

Similarly, in some embodiments each command may have an associated network identifier indicating what specific network or type of network (or network interface) the device is to use for the test, e.g., a particular cellular communications network, all device-available cellular communications networks, a wired network interface, a wireless local area network (WLAN) interface, etc. However, in some embodiments the entire test suite may be associated with one or more networks, types of networks, or interfaces, and thus all commands will be performed using one or multiple networks, network types, network interfaces, etc.

In some embodiments, the monitoring service 102 may provide one or more APIs (e.g., a "PublishTestConfig" method) allowing the client to publish a "test suite" of tests to one or more agents to be performed. Such a request may include data that identifies a test suite (e.g., via an identifier or name of a test suite returned from a previous CreateTestSuite type call), optionally identifies one more targets for the test, optionally specifies a job execution frequency (e.g., run one time, run every X minutes, run according to a defined schedule, or the like). Upon receipt of such a PublishTestConfig type call, the controller 104 may cause a data structure for the test suite (e.g., a "test configuration") to be transmitted to the one or more agents 112 associated with the test suite. This transmission may be instantaneous, such as when the controller 104 has an available connection to the agents, or near-instantaneous, such as when an agent next performs a "heartbeat" type check-in with the controller 104 as described later herein.

As shown at circles (2A), (2B), and (2C), a same or different test configuration may be transmitted to various agents 112A-112N as shown here, though potentially other agents (e.g., agent 112X, agent 112Y, etc.). Each recipient agent 112 may persist the test configuration, optionally overwriting any previous version of the test configuration, and perform the indicated commands according to a schedule (e.g., which may be indicated by the test configuration itself). For example, the agent may perform the commands every minute, every five minutes, every hour, every day, etc.

As part of the testing, the agents 112 may transmit data using one or multiple different networks, which may be wireless "cellular" type networks (e.g., via a cellular-enabled interface to one or more communication service provider (CSP) networks 108B-108C provided by one or more CSPs), other types of wireless or wired networks (e.g., via a WLAN (e.g., WiFi) interface or ethernet type interface to a network provided by a CSP network 108A, such as those used in local networks coupled to coaxial cable networks, fiber-optic networks, telephone cable networks (e.g., Digital Subscriber Line (DSL)), or other physical networks provided by ISPs, for example.

Thus, at circle (3), the agent(s) 112 of the test device(s) 110 may perform the commands specified by the test configuration—e.g., ping tests, download tests, trace route tests—to interact with the associated resources. As indicated throughout, beneficially the agents 112 may interact with resources 118A-118B that may be deployed within a CSP network 108A-108B edge location 116A-116B at circles (4A) or (4B), which may potentially only be available (or may be available at a comparatively lower latency) to subscribers of that particular CSP using the network resources (e.g., physical access networks, cell towers, etc.) of that CSP. Additionally, or alternatively, the agents 112 may interact with other resources 118 such as resources 118C at circle (4C) in a local zone (provider network-managed edge location 140) edge location 116C, and/or resources 118D provided within a region of the provider network 100 itself at circle (4D), which may be provided by one or more services 120. As another example, one set of commands could be to interact with different compute instances of a same application hosted in various edge locations 116A-116C and/or in the provider network 100 itself to determine the different characteristics of these locations.

The agents 112 may collect the results of the commands as raw metric data, which may include the output from each of the applications or tools used to perform the commands. For example, the output from a ping utility used to ping a first resource may be saved, and the output from a traceroute utility used to trace the route to a second resource may also be saved. The outputs from each command may be saved as individual data structures or files or may be consolidated together into a single data structure/file. These outputs may include a variety of types of network-related metric data, such as whether a targeted resource was reachable/responsive, latency values measured between the test device and a resource, etc. Optionally, the agent may supplement this information with additional metadata, such as a wireless signal strength observed by the test device at the time of the command(s), geocoordinate information describing a location of the test device at the time of the execution of the command(s), a date and/or time (e.g., a timestamp) from the time of the execution of the command(s), etc.

In some embodiments, this data resulting from the execution of a test configuration may be immediately transmitted by the agent 112 to the monitoring service 102 (or another service 120 of the provider network 100, such as to a storage location of the storage virtualization service 124, to a stream of a data stream service, or the like, allowing the monitoring service 102 to obtain the data from it), though in other embodiments the agent 112 may send this information, from perhaps multiple executions of one or more test configurations, in a batch. Such a batch transmission may occur according to a schedule (e.g., every hour) or based on another event, such as the agent 112 determining it has entered a particular location, has a particular network available to it, has a threshold number of results to return, etc. This data may optionally be stored in the data store(s) 105, and at circle (5), the metrics processor 106 may obtain the data and process it, e.g., by transforming it into other formats useful by other services 120 or users. For example, the metrics processor 106 may aggregate and emit metrics, such as the average latency observed to a particular resource across multiple test configuration executions from one or multiple agents; this data may be provided to another service or to a user/account associated with the resource.

As another example, the metrics processor 106 may detect potential issues, e.g., by determining whether any individual resources are not responsive, or whether a latency (e.g., an average latency) associated with a resource exceeds a threshold or is otherwise anomalous, etc., and notify one or more other services or users/accounts. As another example, the metrics processor 106 may determine that a threshold number of resources within a particular location (e.g., in a same edge location) are non-responsive or have latencies that deviate from their typical latencies (or pass a threshold latency), and notify another service or user/account. Similarly, in some embodiments the metrics processor may monitor characteristics of received or non-received heartbeat messages (as described further herein) transmitted by test devices to determine characteristics of various communications networks, e.g., the absence of heartbeat messages arriving via a first communications network may indicate that the network is not operating properly.

As another example, the metrics processor 106 may generate metrics pertaining to connectivity latencies between agents and particular target resource locations, and provide these metrics (at circle (6)) to a resource placement component of a service that decides where to place new resources based on performance. For example, the metrics processor 106 may be able to determine current average latencies from clients within a particular city or region to a first edge location, from those clients within the particular city or region to a second edge location, from clients within the particular city or region to a location within the provider network, etc., and provide this data to the other placement service.

Thereafter, a user of the provider network 100 may be able to specify desired placement characteristics for a user's resources (e.g., a compute instance, container, application/code, etc.)—such as that the user desires the resources to be placed in CSP edge locations 142 within a particular geographic area (e.g., a metro area surrounding a major city) that can provide connectivity to users in that geographic area at less than a maximum latency. As another example, the user may wish to place some resources within a threshold amount of latency (e.g., within 20 ms) from a geographic location (e.g., downtown Seattle, Wash.). The service may thus be able to use the metrics provided by the monitoring service 102 to identify these locations for placement, and may cause the placement of the user's resources accordingly (or, provide recommendations to the user as to where to place the resources) at circle (7).

As another example, the metrics processor 106 may generate metrics pertaining to connectivity latencies between particular geographic locations (of agents) and particular target resource locations, and provide these metrics (at circle (6)) to a routing component of a service that provides "routing" information for clients in using to connect to a resource when multiple resources exist. By way of example, a client electronic device executing an application may send a request to a backend service seeking a network address for a resource it can use during execution of the application; the backend service can use the latency metrics to identify, from geolocation data provided by the client (or inferred for the client, such as by analyzing the network address of the client), a particular resource located "closest" (from a network latency perspective) to the client, which can be returned to the client at circle (7).

As another example, the metrics processor 106 may generate metrics pertaining to signal strength of various cellular networks at various locations at different points in time, which can be useful, e.g., for determining where to install additional access points, for creating routes (e.g., for vehicles or devices) that avoid "dead" spots where no network connectivity exists, etc.

As another example, the metrics processor 106 may generate metrics pertaining to the network performance/connectivity of resources and publish metrics to a separate event monitoring service (e.g., AWS CloudWatch), which may be configured with alarms that may be triggered upon particular metrics passing particular thresholds or having a particular value, for example.

As described herein, embodiments can beneficially be used to test network characteristics (e.g., latency, reachability, etc.) of resources provided in edge locations, which in some cases may not be accessible to other systems on the Internet and may instead only be made accessible to users of a CSP, for example. In some embodiments, segments of a cloud provider network—referred to herein as an edge location ("EL") or a provider substrate extension (or "PSE")—can be provisioned within a network that is independent from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" (or edge location) may be an extension of the cloud provider network substrate formed by one or more servers located on-premise in a customer or partner facility, at a separate cloud provider-managed facility, at a communications service provider facility, or other facility including servers wherein such server(s) communicate over a network (e.g., a publicly-accessible network such as the Internet) with a nearby availability zone or region of the cloud provider network. Customers may access an edge location via the cloud provider substrate or another network, and may use the same application programming interfaces (APIs) to create and manage resources in the edge location as they would use to create and manage resources in the region of a cloud provider network.

As indicated above, one example type of edge location is one that is formed by servers located on-premise in a customer or partner facility. This type of substrate extension located outside of cloud provider network data centers can be referred to as an "outpost" of the cloud provider network. Another example type of edge location is one that is formed by servers located in a facility managed by the cloud provider but that includes data plane capacity controlled at least partly by a remote/distinct control plane of the cloud provider network, which may be referred to as a "local zone."

In some embodiments, another example of an edge location is a network deployed within a communications service provider's network, which may be referred to as a "wavelength zone." Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, autonomous vehicles, and other yet-to-be created use cases.

As used herein, the computing resources of the cloud provider network (such as those installed within a communications service provider network) are sometimes also referred to as "cloud provider network edge locations" (or just "edge locations") in that they are closer to the "edge" where end users connect to a network as compared to the more traditional computing resources in a centralized data center. Such edge locations may include one or more networked computer systems that provide customers of the cloud provider network with computing resources to serve end users with lower latency than would otherwise be achievable if those compute instances were hosted in a data center site.

Figure 2:
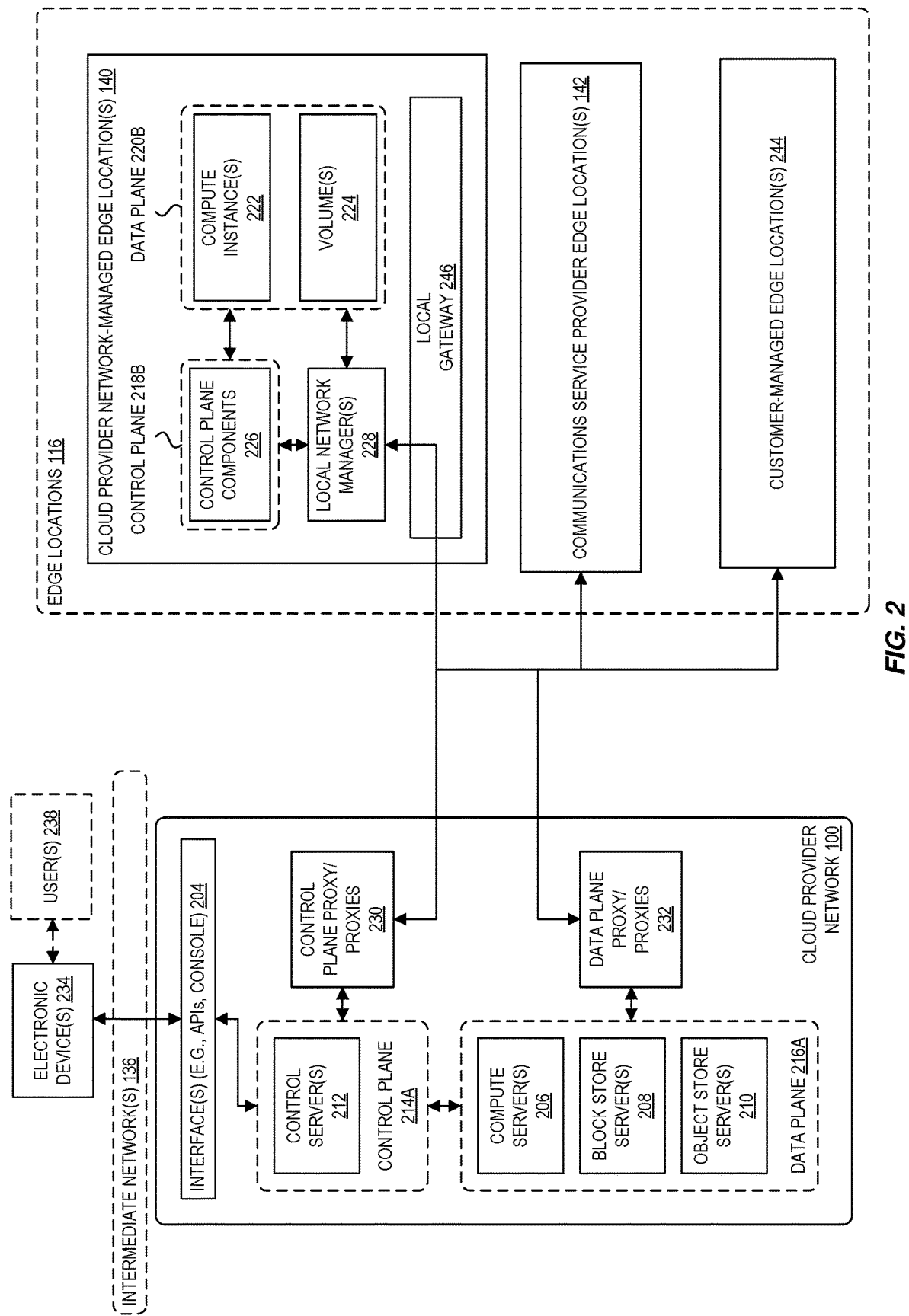
FIG. 2 illustrates an exemplary system including a cloud provider network and further including various edge locations according to some embodiments.

FIG. 2 illustrates an exemplary system including provider network edge locations at which computing resources can be deployed by customers of a provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing services to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 238) can connect to virtualized computing devices and other cloud provider network 100 resources and services using various interfaces 204 (e.g., APIs) via intermediate network(s) 136. An API refers to an interface and/or communication protocol between a client (e.g., software executed by an electronic device 234) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 206, a block store server 208, an object store server 210, a control server 212) can have an IP address in the substrate network. Hardware virtualization technology can enable multiple operating systems to run concurrently on a host computer, for example as virtual machines (VMs) on a compute server 206. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

To provide computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service 126 and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

An on-demand code execution service 126 (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service 126 by uploading their code and using one or more APIs to request that the service 126 identify, provision, and manage any resources required to run the code.

The hardware virtualization service 122 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some embodiments a container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As illustrated, the traffic and operations of the cloud provider network substrate may broadly be subdivided into two categories in various embodiments: control plane traffic carried over a logical control plane 214A and data plane operations carried over a logical data plane 216A. While the data plane 216A represents the movement of user data through the distributed computing system, the control plane 214A represents the movement of control signals through the distributed computing system. The control plane 214A generally includes one or more control plane components or services distributed across and implemented by one or more control servers 212. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 216A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 216A can include one or more compute servers 206, which may be bare metal (e.g., single tenant) or may be virtualized by a hypervisor to run multiple VMs (sometimes referred to as "instances") or microVMs for one or more customers. These compute servers 206 can support a virtualized computing service (or "hardware virtualization service") of the cloud provider network. The virtualized computing service may be part of the control plane 214A, allowing customers to issue commands via an interface 204 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 216A can also include one or more block store servers 208, which can include persistent storage for storing volumes of customer data as well as software for managing these volumes. These block store servers 208 can support a managed block storage service of the cloud provider network. The managed block storage service may be part of the control plane 214A, allowing customers to issue commands via the interface 204 (e.g., an API) to create and manage volumes for their applications running on compute instances. The block store servers 208 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from one gigabyte (GB) to one terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to sixteen) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 216A can also include one or more object store servers 210, which represent another type of storage within the cloud provider network. The object storage servers 210 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge location 116 provides resources and services of the cloud provider network 100 within a separate network, thereby extending functionality of the cloud provider network 100 to new locations (e.g., for reasons related to latency in communications with customer devices, legal compliance, security, etc.). As indicated, such edge locations 116 can include cloud provider network-managed edge locations 140 (e.g., formed by servers located in a cloud provider-managed facility separate from those associated with the cloud provider network 100), communications service provider edge locations 142 (e.g., formed by servers associated with communications service provider facilities), customer-managed edge locations 244 (e.g., formed by servers located on-premise in a customer or partner facility), among other possible types of edge locations.

As illustrated, the example cloud provider network-managed edge location 140 can similarly include a logical separation between a control plane 218B and a data plane 220B, respectively extending the control plane 214A and data plane 216A of the cloud provider network 100. The edge location 140 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more edge location servers can be provisioned by the cloud provider for deployment within an edge location 116. As described above, the cloud provider network 100 may offer a set of predefined instance types, each having varying types and quantities of underlying hardware resources. Each instance type may also be offered in various sizes.

In order to enable customers to continue using the same instance types and sizes in an edge location 116 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other instances are still running and consuming other capacity of the edge location servers. This can improve utilization of computing resources within the edge location by allowing for better packing of running instances on servers, and also may provide a seamless experience regarding instance usage across the cloud provider network 100 and the cloud provider network edge location 140.

As illustrated, the edge location servers can host one or more compute instances 222. Compute instances 222 can be VMs, or containers that package up code and all its dependencies so an application can run quickly and reliably across computing environments (e.g., including VMs). In addition, the servers may host one or more data volumes 224, if desired by the customer. In the region of a cloud provider network 100, such volumes may be hosted on dedicated block store servers. However, due to the possibility of having a significantly smaller capacity at an edge location 116 than in the region, an optimal utilization experience may not be provided if the edge location includes such dedicated block store servers. Accordingly, a block storage service may be virtualized in an edge location 116, such that one of the VMs runs the block store software and stores the data of a volume 224. Similar to the operation of a block storage service in the region of a cloud provider network 100, the volumes 224 within an edge location 116 may be replicated for durability and availability. The volumes may be provisioned within their own isolated virtual network within the edge location 116. The compute instances 222 and any volumes 224 collectively make up a data plane extension 220B of the provider network data plane 216A within the edge location 116.

The servers within an edge location 116 may, in some implementations, host certain local control plane components 226, for example, components that enable an edge location 116 to continue functioning if there is a break in the connection back to the cloud provider network 100. Examples of these components include a migration manager that can move compute instances 222 between edge location servers if needed to maintain availability, and a key value data store that indicates where volume replicas are located. However, generally the control plane 218B functionality for an edge location will remain in the cloud provider network 100 in order to allow customers to use as much resource capacity of the edge location as possible.

Server software running at an edge location 116 may be designed by the cloud provider to run on the cloud provider substrate network, and this software may be enabled to run unmodified in an edge location 116 by using local network manager(s) 228 to create a private replica of the substrate network within the edge location (a "shadow substrate"). The local network manager(s) 228 can run on edge location 140 servers and bridge the shadow substrate with the edge location 140 network, for example, by acting as a virtual private network (VPN) endpoint or endpoints between the edge location 140 and the proxies 230/232 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 228 allows resources in the edge location 140 to seamlessly communicate with resources in the cloud provider network 100. In some implementations, a single local network manager can perform these actions for all servers hosting compute instances 222 in an edge location 116. In other implementations, each of the server hosting compute instances 222 may have a dedicated local network manager In multi-rack edge locations, inter-rack communications can go through the local network managers, with local network managers maintaining open tunnels to one another.

Edge locations can utilize secure networking tunnels through the edge location 140 network to the cloud provider network 100, for example, to maintain security of customer data when traversing the edge location 140 network and any other intermediate network (which may include the public internet). Within the cloud provider network 100, these tunnels are composed of virtual infrastructure components including isolated virtual networks (e.g., in the overlay network), control plane proxies 230, data plane proxies 232, and substrate network interfaces. Such proxies may be implemented as containers running on compute instances. In some embodiments, each server in an edge location 116 that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between an edge location 116 location and the cloud provider network 100 can be used for control and data plane communications. As compared to a VPN through other networks, the direct connection can provide constant bandwidth and more consistent network performance because of its relatively fixed and stable network path.

A control plane (CP) proxy 230 can be provisioned in the cloud provider network 100 to represent particular host(s) in an edge location. CP proxies are intermediaries between the control plane 214A in the cloud provider network 100 and control plane targets in the control plane 218B of edge location 140. That is, CP proxies 230 provide infrastructure for tunneling management API traffic destined for edge location servers out of the region substrate and to the edge location 140. For example, a virtualized computing service of the cloud provider network 100 can issue a command to a VMM of a server of an edge location 116 to launch a compute instance 222. A CP proxy maintains a tunnel (e.g., a VPN) to a local network manager 228 of the edge location. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at an edge location 116 or may be able to manage control plane traffic for multiple servers in the same edge location.

A data plane (DP) proxy 232 can also be provisioned in the cloud provider network 100 to represent particular server(s) in an edge location 116. The DP proxy 232 acts as a shadow or anchor of the server(s) and can be used by services within the cloud provider network 100 to monitor health of the host (including its availability, used/free compute and capacity, used/free storage and capacity, and network bandwidth usage/availability). The DP proxy 232 also allows isolated virtual networks to span edge locations 140 and the cloud provider network 100 by acting as a proxy for server(s) in the cloud provider network 100. Each DP proxy 232 can be implemented as a packet-forwarding compute instance or container. As illustrated, each DP proxy 232 can maintain a VPN tunnel with a local network manager 228 that manages traffic to the server(s) that the DP proxy 232 represents. This tunnel can be used to send data plane traffic between the edge location server(s) and the cloud provider network 100. Data plane traffic flowing between an edge location 116 and the cloud provider network 100 can be passed through DP proxies 232 associated with that edge location. For data plane traffic flowing from an edge location 116 to the cloud provider network 100, DP proxies 232 can receive encapsulated data plane traffic, validate it for correctness, and allow it to enter into the cloud provider network 100. DP proxies 232 can forward encapsulated traffic from the cloud provider network 100 directly to an edge location 116.

Local network manager(s) 228 can provide secure network connectivity with the proxies 230/232 established in the cloud provider network 100. After connectivity has been established between the local network manager(s) 228 and the proxies, customers may issue commands via the interface 204 to instantiate compute instances (and/or perform other operations using compute instances) using edge location resources in a manner analogous to the way in which such commands would be issued with respect to compute instances hosted within the cloud provider network 100. From the perspective of the customer, the customer can now seamlessly use local resources within an edge location (as well as resources located in the cloud provider network 100, if desired). The compute instances set up on a server at an edge location 116 may communicate both with electronic devices located in the same network as well as with other resources that are set up in the cloud provider network 100, as desired. A local gateway 246 can be implemented to provide network connectivity between an edge location 116 and a network associated with the extension (e.g., a communications service provider network in the example of an edge location 142).

There may be circumstances that necessitate the transfer of data between the object storage service and an edge location 116. For example, the object storage service may store machine images used to launch VMs, as well as snapshots representing point-in-time backups of volumes. The object gateway can be provided on an edge location server or a specialized storage device, and provide customers with configurable, per-bucket caching of object storage bucket contents in their edge location to minimize the impact of edge location-region latency on the customer's workloads. The object gateway can also temporarily store snapshot data from snapshots of volumes in the edge location and then sync with the object servers in the region when possible. The object gateway can also store machine images that the customer designates for use within the edge location or on the customer's premises. In some implementations, the data within the edge location may be encrypted with a unique key, and the cloud provider can limit keys from being shared from the region to the edge location for security reasons. Accordingly, data exchanged between the object store servers and the object gateway may utilize encryption, decryption, and/or re-encryption to preserve security boundaries with respect to encryption keys or other sensitive data. The transformation intermediary can perform these operations, and an edge location bucket can be created (on the object store servers) to store snapshot and machine image data using the edge location encryption key.

In the manner described above, an edge location thus provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones" that may be connected in various ways to a publicly accessible network such as the Internet, for example directly, via another network, or via a private connection to a region. Although typically a local zone would have more limited capacity than a region, in some cases a local zone may have substantial capacity, for example, thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations "homed" to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 3:
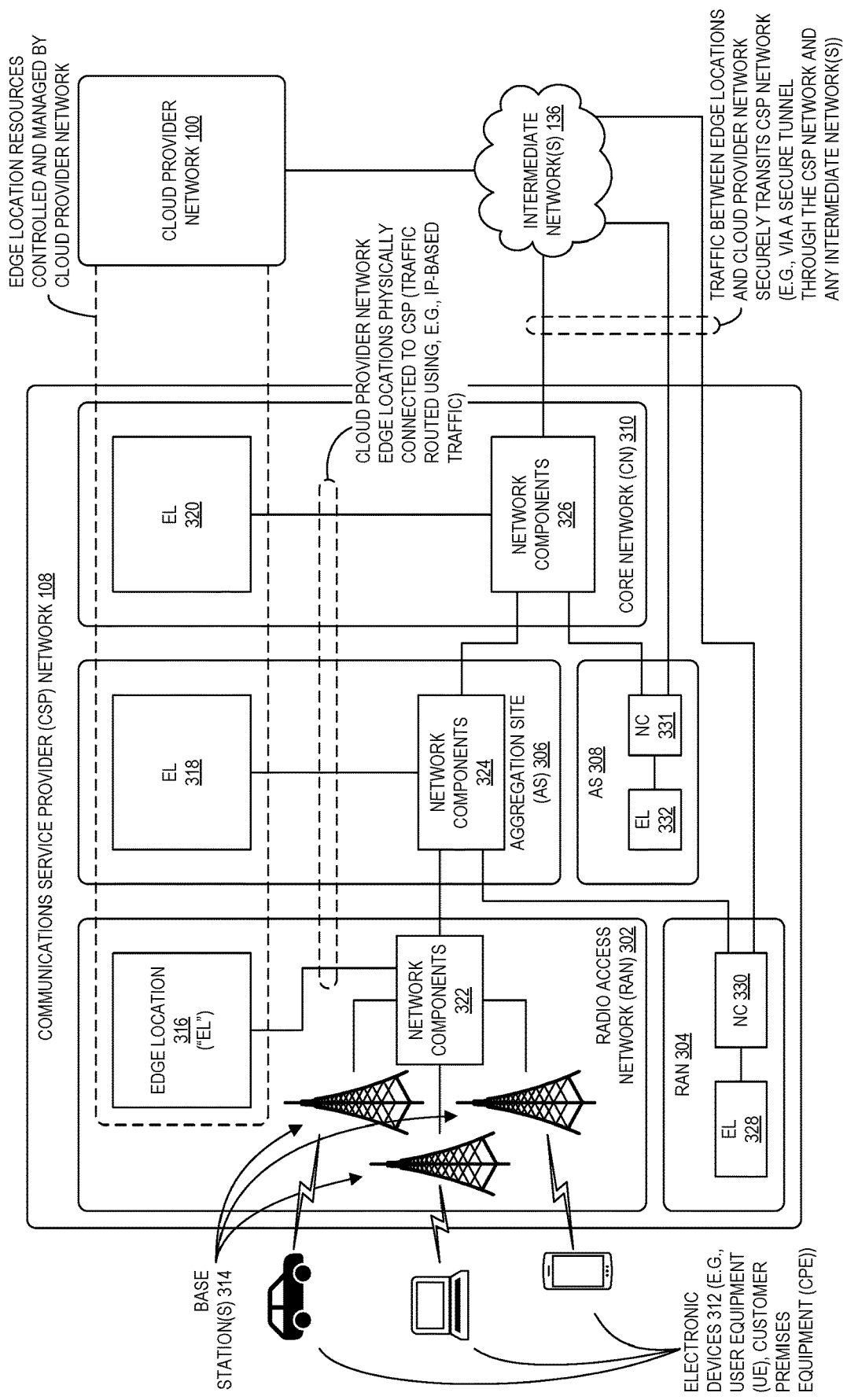
FIG. 3 illustrates an exemplary system in which cloud provider network substrate extensions are deployed within a communications service provider network according to some embodiments.

FIG. 3 illustrates an exemplary system in which cloud provider network edge locations are deployed within a communications service provider network according to some embodiments. A communications service provider (CSP) network 108 generally includes a downstream interface to end user electronic devices and an upstream interface to other networks (e.g., the internet). In this example, the CSP network 108 is a wireless "cellular" CSP network that includes radio access networks (RAN) 302/304, aggregation sites (AS) 306/308, and a core network (CN) 310. The RANs 302/304 include base stations (e.g., NodeBs, eNodeBs, gNodeBs) that provide wireless connectivity to electronic devices 312. The core network 310 typically includes functionality related to the management of the CSP network (e.g., billing, mobility management, etc.) and transport functionality to relay traffic between the CSP network and other networks. Aggregation sites 306/308 can serve to consolidate traffic from many different radio access networks to the core network and to direct traffic originating from the core network to the various radio access networks.

From left to right in FIG. 3, end user electronic devices 312 wirelessly connect to base stations (or radio base stations) 314 of a radio access network 302. Such electronic devices 312 are sometimes referred to as user equipment (UE) or customer premises equipment (CPE). Data traffic is often routed through a fiber transport network consisting of multiple hops of layer 3 routers (e.g., at aggregation sites) to the core network 310. The core network 310 is typically housed in one or more data centers. For data traffic destined for locations outside of the CSP network 108, the network components 322-326 typically include a firewall through which traffic can enter or leave the CSP network 108 to external networks such as the internet or a cloud provider network 100. Note that in some embodiments, the CSP network 108 can include facilities to permit traffic to enter or leave from sites further downstream from the core network 310 (e.g., at an aggregation site or RAN).

Edge locations 316-320 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, edge locations 316, 318, and 320 are in communication with a cloud provider network 100.

Typically, the further—e.g., in terms of network hops and/or distance—an edge location is from the cloud provider network 100 (or closer to electronic devices 312), the lower the network latency is between computing resources within the edge location and the electronic devices 312. However, physical site constraints often limit the amount of edge location computing capacity that can be installed at various points within the CSP or determine whether computing capacity can be installed at various points at all. For example, an edge location sited within the core network 310 can typically have a much larger footprint (in terms of physical space, power requirements, cooling requirements, etc.) than an edge location sited within the RAN 302, 304.

The installation or siting of edge locations within a CSP network can vary subject to the particular network topology or architecture of the CSP network. As indicated in FIG. 3, edge locations can generally be connected anywhere the CSP network can break out packet-based traffic (e.g., IP based traffic). Additionally, communications between a given edge location and the cloud provider network 100 typically securely transit at least a portion of the CSP network 108 (e.g., via a secure tunnel, virtual private network, a direct connection, etc.). In the illustrated example, the network components 322 facilitate the routing of data traffic to and from an edge location 316 integrated with the RAN 302, the network components 324 facilitate the routing of data traffic to and from an edge location 318 integrated with the AS 306, and the network components 326 facilitate the routing of data traffic to and from an edge location 320 integrated with the CN 310. Network components 322-326 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between an edge location 328 and the cloud provider network 100 can be broken out of the CSP network 108 without routing through the core network 310. For example, network components 330 of a RAN 304 can be configured to route traffic between an edge location 316 of the RAN 304 and the cloud provider network 100 without traversing an aggregation site or core network 310. As another example, network components 331 of an aggregation site 308 can be configured to route traffic between an edge location 332 of the aggregation site 308 and the cloud provider network 100 without traversing the core network 310. The network components 330, 331 can include a gateway or router having route data to direct traffic from the edge location destined for the cloud provider network 100 to the cloud provider network 100 (e.g., through a direct connection or an intermediate network 334) and to direct traffic from the cloud provider network 100 destined for the edge location to the edge location.

In some embodiments, edge locations can be connected to more than one CSP network. For example, when two CSPs share or route traffic through a common point, an edge location can be connected to both CSP networks. For example, each CSP can assign some portion of its network address space to the edge location, and the edge location can include a router or gateway that can distinguish traffic exchanged with each of the CSP networks. For example, traffic destined for the edge location from one CSP network might have a different destination IP address, source IP address, and/or virtual local area network (VLAN) tag than traffic received from another CSP network. Traffic originating from the edge location to a destination on one of the CSP networks can be similarly encapsulated to have the appropriate VLAN tag, source IP address (e.g., from the pool allocated to the edge location from the destination CSP network address space) and destination IP address.

Note that while the exemplary CSP network architecture of FIG. 3 includes radio access networks, aggregation sites, and a core network, the architecture of a CSP network can vary in naming and structure across generations of wireless technology, between different CSPs, as well as between wireless and fixed-line CSP networks. Additionally, while FIG. 3 illustrates several locations where an edge location can be sited within a CSP network, other locations are possible (e.g., at a base station).

Figure 4:
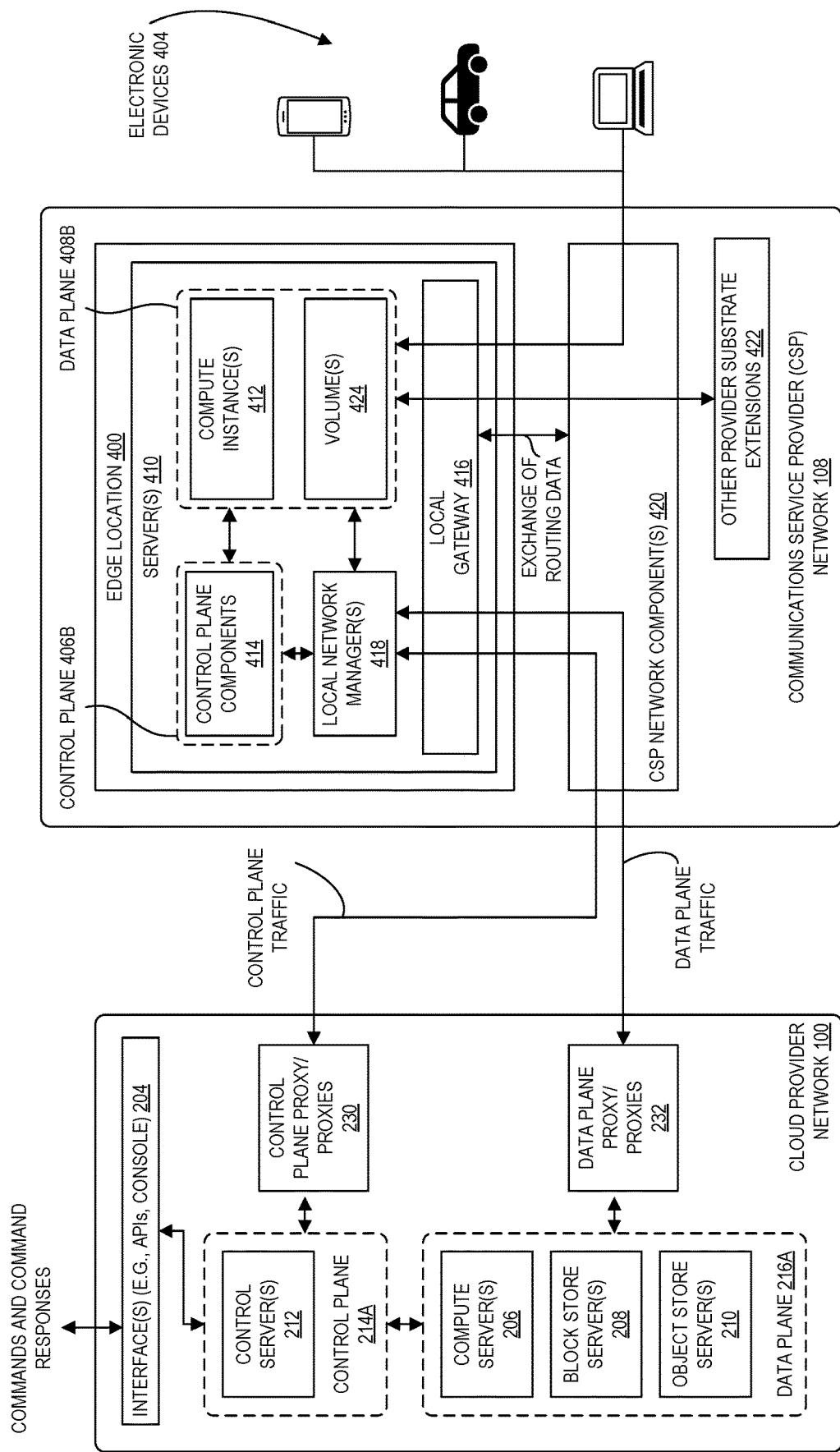
FIG. 4 illustrates in greater detail exemplary components of and connectivity between an edge location and a cloud provider network according to some embodiments.

FIG. 4 illustrates in greater detail exemplary components of and connectivity between an edge location associated with a communications service provider and a cloud provider network according to some embodiments. An edge location 400 provides resources and services of the cloud provider network within a CSP network 108 thereby extending functionality of the cloud provider network 100 to be closer to end user devices 404 connected to the CSP network.

The edge location 400 similarly includes a logical separation between a control plane 406B and a data plane 408B, respectively extending the control plane 214A and data plane 216A of the cloud provider network 100. The edge location 400 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more edge location servers 410 can be provisioned by the cloud provider for deployment within the CSP network 108.

The servers 410 within an edge location 400 may, in some implementations, host certain local control plane components 414, for example, components that enable the edge location 400 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 406B functionality for an edge location 400 will remain in the cloud provider network 100 to allow customers to use as much resource capacity of the edge location as possible.

As illustrated, the edge location servers 410 can host compute instances 412. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 410 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 410 may host one or more data volumes 424, if desired by the customer. The volumes may be provisioned within their own isolated virtual network within the edge location 400. The compute instances 412 and any volumes 424 collectively make up a data plane extension 408B of the provider network data plane 216A within the edge location 400.

A local gateway 416 can be implemented to provide network connectivity between the edge location 400 and the CSP network 108. The cloud provider can configure the local gateway 416 with an IP address on the CSP network 108 and to exchange routing data (e.g., via the Border Gateway Protocol (BGP)) with the CSP network components 420. The local gateway 416 can include one or more route tables that control the routing of inbound traffic to the edge location 400 and outbound traffic leaving the edge location 400. The local gateway 416 can also support multiple VLANs in cases where the CSP network 108 uses separate VLANs for different portions of the CSP network 108 (e.g., one VLAN tag for the wireless network and another VLAN tag for a fixed network).

In some embodiments of an edge location 400, the extension includes one or more switches, sometimes referred to top of rack (TOR) switches (e.g., in rack-based embodiments). The TOR switches are connected to CSP network routers (e.g., CSP network components 420), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 108 to facilitate the exchange of routing data.

Data plane traffic originating from the edge location 400 can have a number of different destinations. For example, traffic addressed to a destination in the data plane 216A of the cloud provider network 100 can be routed via the data plane connection between the edge location 400 and the cloud provider network 100. The local network manager 418 can receive a packet from a compute instance 412 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 412 addressed to another compute instance hosted in another edge location 422, the local network manager 418 can encapsulate the packet with a destination as the IP address assigned to the other edge location 422, thereby allowing the CSP network components 420 to handle the routing of the packet. Alternatively, if the CSP network components 420 do not support inter-edge location traffic, the local network manager 418 can address the packet to a relay in the cloud provider network 100 that can send the packet to the other edge location 422 via its data plane connection (not shown) to the cloud provider network 100. Similarly, for traffic from a compute instance 412 address to a location outside of the CSP network 108 or the cloud provider network 100 (e.g., on the internet), if the CSP network components 420 permit routing to the internet, the local network manager 418 can encapsulate the packet with a source IP address corresponding to the IP address in the carrier address space assigned to the compute instance 412. Otherwise, the local network manager 418 can send the packet to an Internet Gateway in the cloud provider network 100 that can provide Internet connectivity for the compute instance 412. For traffic from a compute instance 412 addressed to an electronic device 404, the local gateway 416 can use Network Address Translation (NAT) to change the source IP address of the packet from an address in an address space of the cloud provider network to an address space of the carrier network.

The local gateway 416, local network manager(s) 418, and other local control plane components 414 may run on the same servers 410 that host compute instances 412, may run on a dedicated processor (e.g., on an offload card) integrated with edge location servers 410, or can be executed by servers separate from those that host customer resources.

Figure 5:
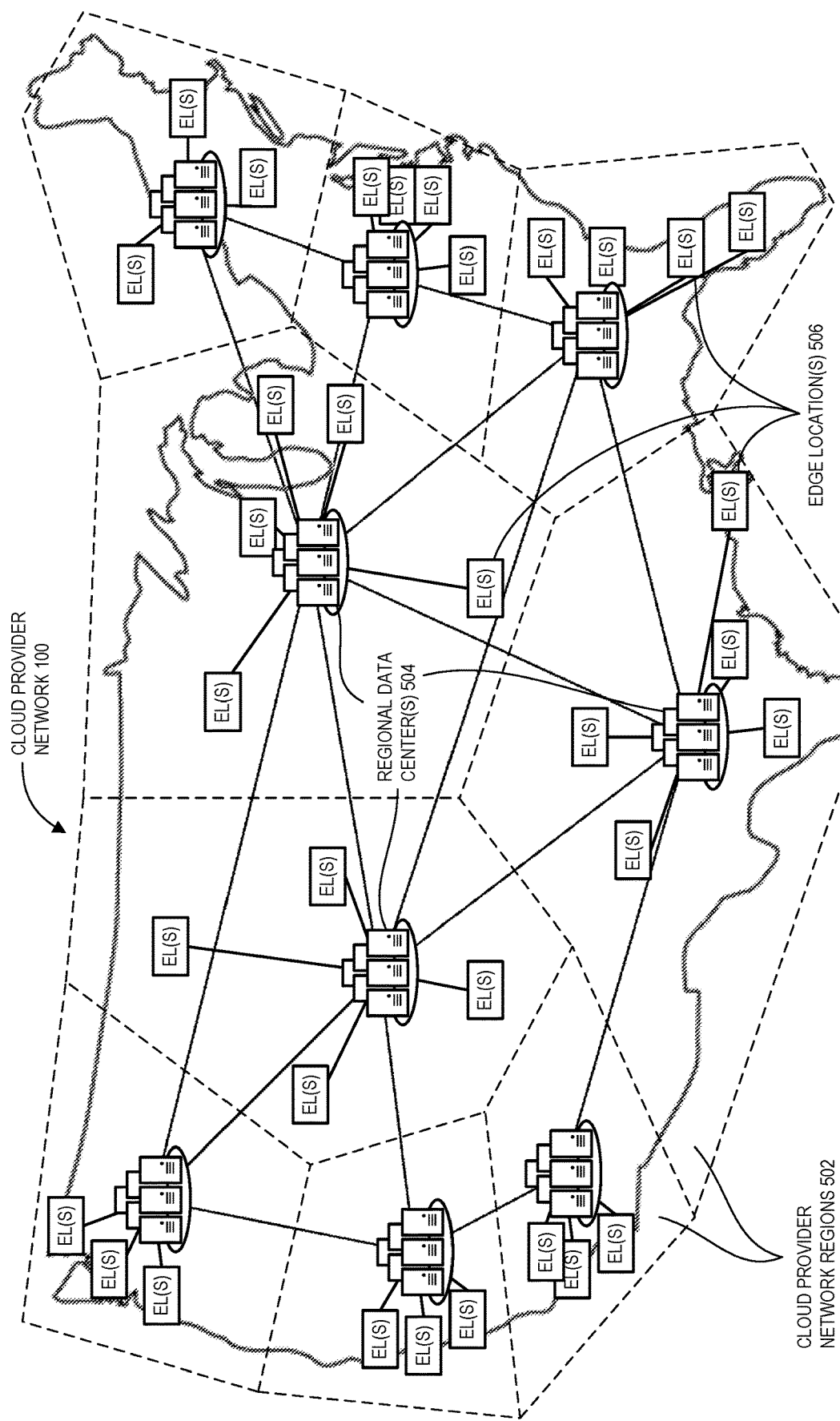
FIG. 5 illustrates an exemplary cloud provider network including edge locations according to some embodiments.

FIG. 5 illustrates an exemplary cloud provider network including edge locations according to some embodiments. As illustrated, a cloud provider network 100 can be formed as a number of regions 502, where a region is a separate geographical area in which the cloud provider has one or more data centers 504. Each region 502 can include two or more availability zones (AZs) connected to one another via a private high-speed network such as, for example, a fiber communication connection. An AZ refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 506 can be much higher. Such widespread deployment of edge locations 506 can provide low-latency connectivity to the cloud for a much larger group of end user devices (in comparison to those that happen to be very close to a regional data center). In some embodiments, each edge location 506 can be peered to some portion of the cloud provider network 100 (e.g., a parent availability zone or regional data center). Such peering allows the various components operating in the cloud provider network 100 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 506 can be structured in several ways. In some implementations, an edge location 506 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as far zones (due to being far from other availability zones) or near zones (due to being near to customer workloads). A far zone may be connected in various ways to a publicly accessible network such as the Internet, for example directly, via another network, or via a private connection to a region. Although typically a far zone would have more limited capacity than a region, in some cases a far zone may have substantial capacity, for example thousands of racks or more.

The parenting of a given edge location to an AZ or region of the cloud provider network can be based on a number of factors. One such parenting factor is data sovereignty. For example, to keep data originating from a CSP network in one country within that country, the edge locations deployed within that CSP network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

One benefit provided by the utilization of edge locations with backing cloud provider networks is that computing resources implemented within edge locations are "closer" to end users, and thus such architectures can provide extremely low-latency interactions preferred by modern computing applications, such as video gaming, communications, etc. Thus, systems employing edge locations can satisfy customer use cases requiring low client latency and can allow users to launch compute instances (and other computing resources) around geographic areas to guarantee reliably low latencies for all clients in the coverage area. Moreover, such systems can provide a way for clients—e.g., mobile clients or wired clients—to be able to easily "discover" which computing instance(s) implementing an application they should connect to, given their current location.

Figure 6:
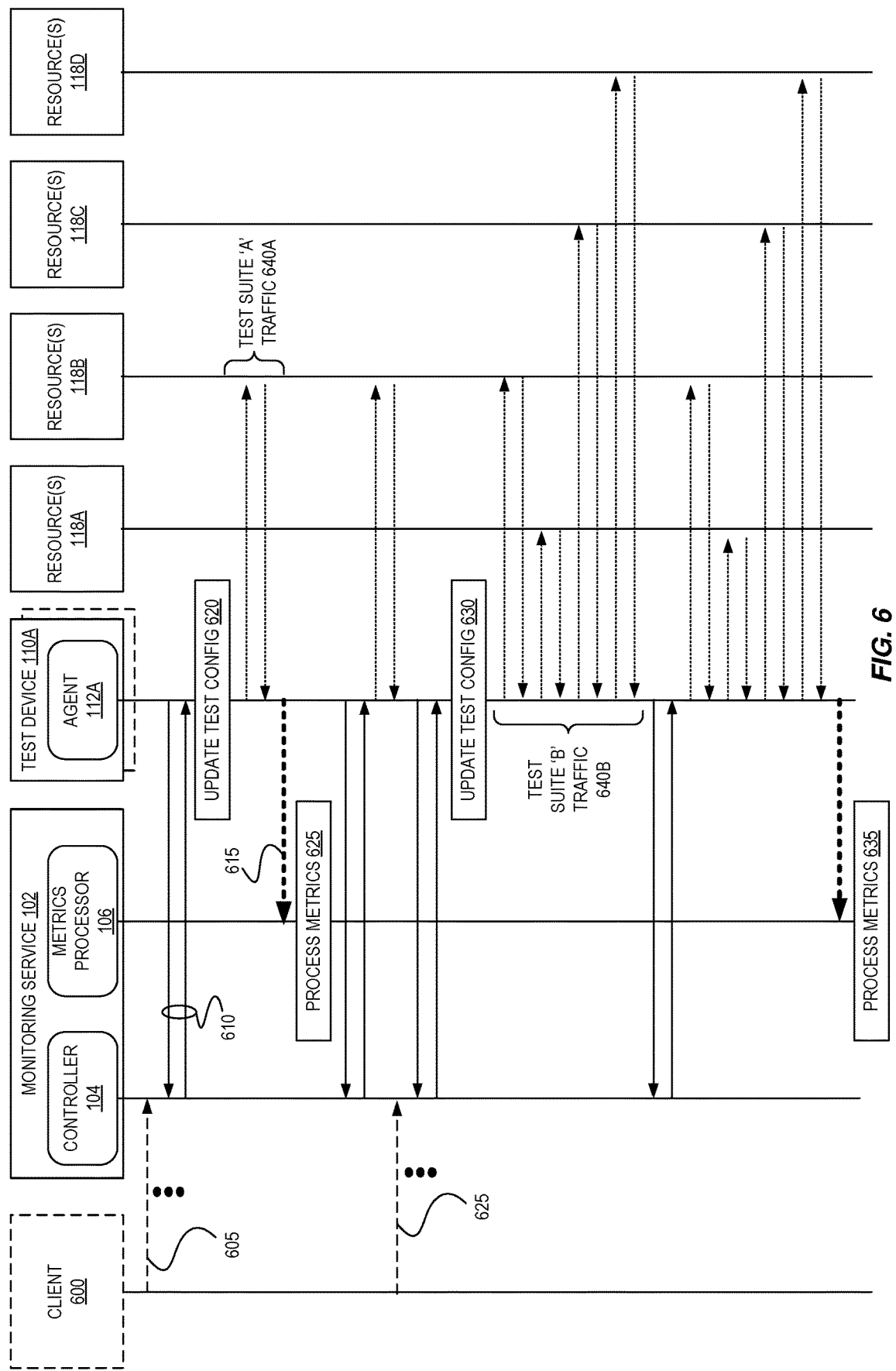
FIG. 6 is a sequence diagram illustrating messaging between components for distributed network connectivity monitoring of provider network edge location resources from cellular networks according to some embodiments.

For further detail, FIG. 6 is a sequence diagram illustrating messaging between components for distributed network connectivity monitoring of provider network edge location resources from cellular networks according to some embodiments. In FIG. 6, example messaging and operations involving a client 600, a controller 104 and a metrics processor 106 of the monitoring service 102, at least a test device 110A executing an agent 112A, and multiple resources 118A-118D are illustrated; however, these illustrated operations and messages present just one scenario, and other scenarios with more, fewer, and/or different operations and messages may be used. Moreover, this example does not show other messages and operations of some embodiments for the sake of clarity of description.

The client 600 may be a software client executed by a computing device and may perform actions responsive to interactions with a user or may operate in an autonomous fashion responsive to other events. As shown, the client 600 may transmit one or more messages 605 to cause a test configuration to be published to at least a first agent 112A.

For example, the one or more messages 605 may include one or multiple of a RegisterDevice API call to register a test device (e.g., test device 110A) and/or one or more target devices (e.g., compute instances corresponding to resources 118A-118D, which may be at one or more locations) for use. The one or more messages 605 may include, additionally or alternatively, a CreateTestSuite API call to create a new test configuration and one or more AddCommandsToDevice API calls to add one or more commands to the created test suite. The one or more messages 605 may include, additionally or alternatively, a PublishTestConfiguration API call to cause the controller 104 to "publish" the test suite in the form of a test configuration to an associated agent 112A/test device 110A.

In this example, the test device 110A has been operational and has been configured to periodically perform a heartbeat procedure via messages 610, where the test device 110A may send a heartbeat message to the controller 104, which may identify the test device 110A and/or agent 112A, include a current timestamp, a version identifier of the current test configuration it is utilizing, a timestamp of a "last" test execution, and/or a summary of the "last" test execution indicating the status of that test, e.g., including data such as whether the test was a success, whether the output was successfully uploaded, the latency of the test, the latency of the output upload, etc.

In response, the controller 104 may compare the version identifier of the current test configuration and determine that a new or updated test configuration exists for this agent based on the operations of message(s) 605. In response, the controller 104 may send the new or updated test configuration to the agent 112A, which persists/updates the test configuration at 620. In some embodiments, the controller 104 may additionally or alternatively send other commands or data to the agent 112A via the heartbeat procedure, such as commands to configure or reconfigure the agent or test device, install new or different software, change properties of the agent or test device (e.g., networking settings), configure how the agent communicates with other entities, commands to debug or troubleshoot the agent or test device, etc.

The agent 112A may then immediately execute the commands of the test configuration or await a next invocation (e.g., according to a schedule). In this example, when this occurs the execution of the commands (e.g., an ICMP or TCP ping) of the test configuration results in traffic for the initial test suite 'A' 640A, which involves interacting with the resources 118B. At some point thereafter, the results of the command(s) in the form of raw metric data may be sent to the metrics processor 106 as shown by message 615, though in various embodiments this upload may include uploading the raw metric data in a batch to a storage location or to a stream, where it may then be accessed by the metrics processor 106 and then processed at 625.

The agent 112A may then continue to execute the test configuration as configured and perform the heartbeat procedure as configured. At some point, the client 600 may cause the test suite to be updated via one or more messages 625, e.g., via one or more AddCommandsToDevice API calls to add one or more commands to the created test suite (or other similar API calls to add, remove, edit, etc., commands associated with the test suite) and a PublishTestConfiguration API call. After a next heartbeat, the controller 104 provides the updated test configuration to the agent 112A, which updates/stores the new version of the test configuration at 630 and now begins to performs the updated set of commands—here, transmissions involving the previous resources 118B as dictated by the original test suite and new transmissions involving resources 118A and 118C-118D, resulting in test suite 'B' traffic 640B. The process may continue as described herein, with further heartbeating (e.g., every minute), and an immediate or delayed (e.g., batched) uploading of the output (raw metric data), which will again be processed by the metrics processor 106 at block 635.

Figure 7:
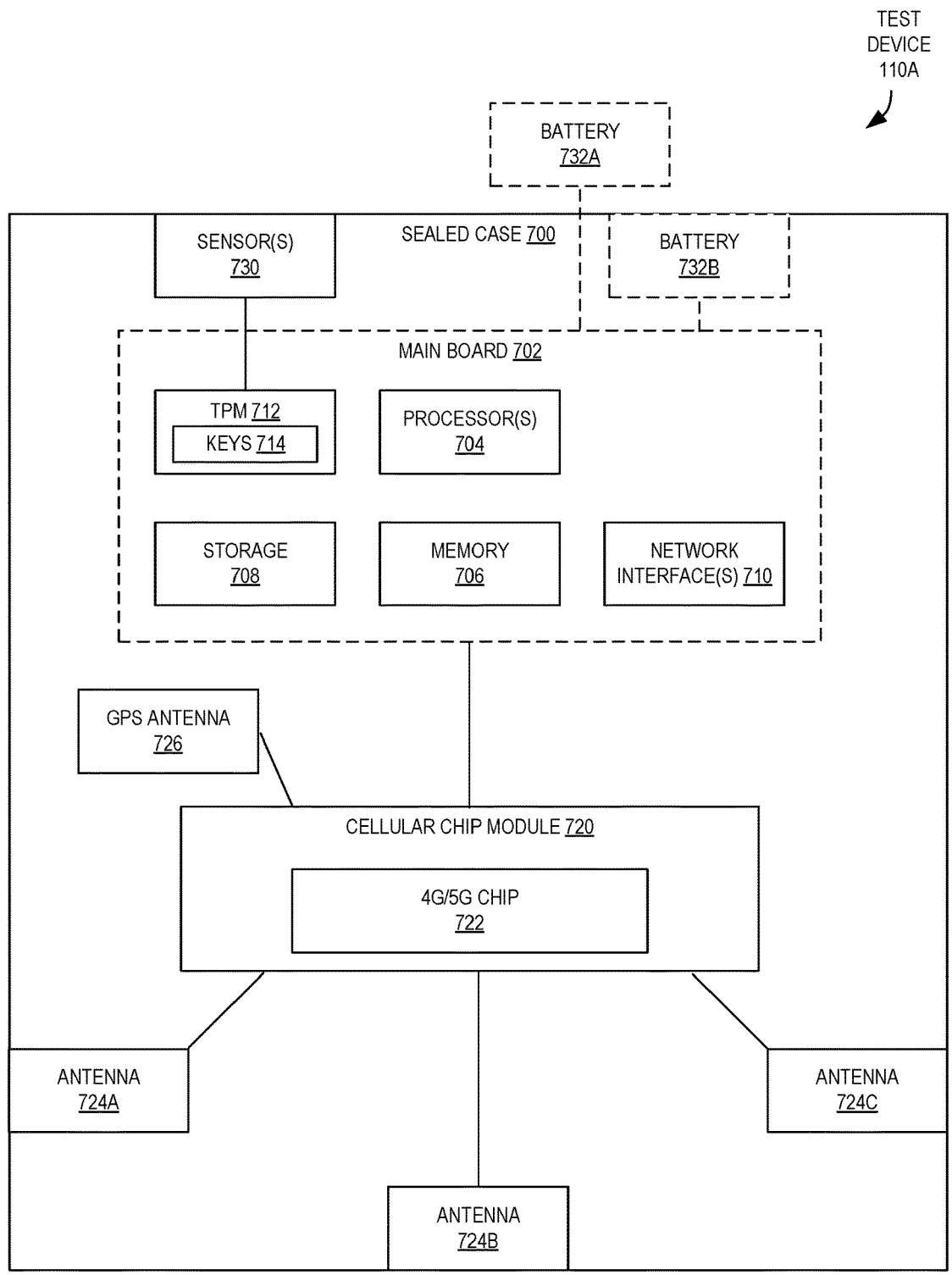
FIG. 7 is a diagram illustrating exemplary components of a test device useful for distributed network connectivity monitoring of provider network edge location resources from cellular networks according to some embodiments.

As described herein, various test devices may be utilized to assist in testing various resources. FIG. 7 is a diagram illustrating exemplary components of a test device 110A useful for distributed network connectivity monitoring of provider network edge location resources from cellular networks according to some embodiments. FIG. 7 shows components within a sealed case 700 (e.g., a water/weather-resistant plastic case), including one or more processors 704, a memory 706 (e.g., RAM), non-volatile storage 708 (removable and/or non-removable), one or more network interfaces 710 (e.g., an Ethernet physical interface, a wireless local area network (WLAN) network interface that can communicate using ones of the IEEE 802.11 suite of protocols) that may optionally be used to communicate to the service provider network, etc. In some embodiments, these components may be attached to a main board 702, which may also have attached thereto a Trusted Platform Module (TPM) chip 712 that can store one or more encryption keys 714 used to decrypt a portion (e.g., a data partition) of the data of storage 708 (e.g., an SD card). In some embodiments, the TPM chip 712 is coupled to one or more sensor devices 730, e.g., microswitches that can act as a sensor when the case 700 is opened. In some embodiments, the sensor devices 730 may include microswitches that utilize a metal flap attached with a spring which can be configured to transmit a signal to the TPM 712 (and/or processor(s) 704) when a lid of the case 700 is moved from the closed position. In some embodiments, upon the sensor devices 730 sensing that the lid is moved—i.e., that the test device may currently be in the process of being tampered with—the keys 714 can be destroyed (e.g., erased, modified, etc.) to prevent the contents of the storage 708 from being read.

In some embodiments, the test device 110A further includes a cellular chip module 720 comprising a cellular communications chip 722 (e.g., a 4G or 5G LTE chip), which may use one or multiple antennae 724A-724C to communicate via one or multiple different CSP networks, which may be used for performing the job commands of the test configuration. The cellular chip module 720 (or alternatively, the main board 702) may further be coupled to a GPS antenna 726, allowing the test device 110A to determine its geolocation (e.g., coordinates), which may be reported back to the controller with raw metric data as described herein.

In some embodiments, the network interface(s) 710 includes a WLAN interface that can be used to emit results to the monitoring service, to test network connectivity via another network that is not a cellular network under test, to provide remote access to the test device via the internet, etc. Such a WLAN interface may also be configured to connect to a preconfigured WiFi Hotspot, in the event that the devices' network (e.g., WLAN or Ethernet) configuration to enable remote access is invalid—e.g., a configured WLAN network is no longer available, or the Ethernet-connected network blocks remote administration. The WiFi Hotspot fallback may utilize an operator-configured separate WiFi network (e.g., a hotspot feature on a mobile phone) to use a specific WiFi network name (e.g., a service set identifier (SSID)) and password (e.g., a pre-shared key (PSK)) that enables the device to connect to the Internet, enabling remote access for reconfiguration.

In some embodiments, the test device 110A may be primarily non-mobile (e.g., for installation in a building or another at least semi-protected location) and may include a non-illustrated power supply and/or wiring for power. The test device 110A may additionally or alternatively be coupled to an external battery 732A (e.g., via a USB—C type coupling) or include a battery 732B allowing the test device 110A to be a mobile device. For example, in some embodiments, the test device 110A may be attached to a vehicle (e.g., a delivery vehicle, personal automobile, mass transit vehicle, etc.), placed in (or attached to) a backpack or an item of clothing, etc., allowing for tests to occur in different geographic locations (e.g., possibly using different cellular towers) as the device is moved. Moreover, such as when the battery 732A is externally coupled, the battery 732A may potentially be quickly switched to a fully-charged battery, as needed, with minimal resultant downtime.

However, other test device configurations may also be used. For example, in some embodiments a test device may not itself have a cellular chip module 720 and/or antennae 724A-724C, but may instead include an interface (e.g., a Universal Serial Bus (USB) type interface) allowing the test device to be physically coupled with another device, such as a cellular phone or tablet or modem, allowing the test device to utilize the cellular (or other) network connectivity provided by this other device.

Figure 8:
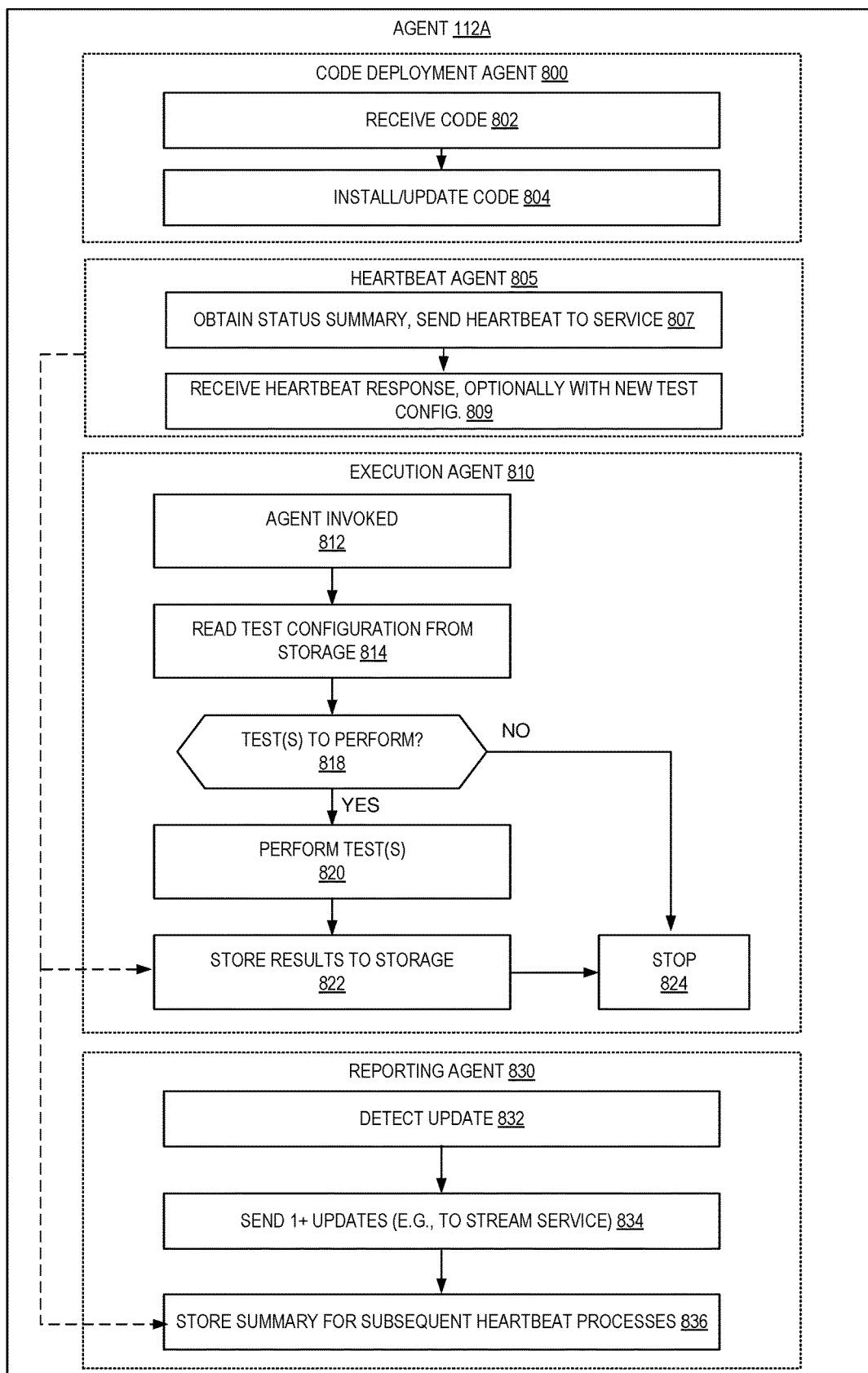
FIG. 8 is a diagram illustrating exemplary operations of various agents of a test device for distributed network connectivity monitoring of provider network edge location resources from cellular networks according to some embodiments.

FIG. 8 is a diagram illustrating exemplary operations of various agents of a test device for distributed network connectivity monitoring of provider network edge location resources from cellular networks according to some embodiments. As described herein, an agent 112A executed by a test device (or in another location) may use one or more individual agents to perform various tasks. In some embodiments, the agent 112A includes a code deployment agent 800 that may receive code (e.g., for one or more of the agents themselves) at block 802 from the monitoring service 102 (or a code deployment service used by the monitoring service 102) and at block 804 install or update the code. In this manner, the agent 112A may be kept up to date with new versions of its software.

In some embodiments, the agent 112A includes a heartbeat agent 805 that orchestrates the heartbeat processes. The heartbeat agent 805 may be invoked on a periodic basis (e.g., every minute, every two minutes, every five minutes) or scheduled basis, obtain a status summary (e.g., from storage, indicating a version of one or more of the agents, an identifier of the test configuration and/or version thereof, an identifier of when the test configuration was last run, a status identifier of the last run of the test configuration, a location of the agent/device, characteristics and/or a configuration setting of the agent/device, etc.), and provide some or all of this information in a heartbeat message sent back to the monitoring service at block 807. If the monitoring service determines that nothing needs to change, a heartbeat response may be sent at block 809 back with no updates (effectively submitting an acknowledgement or "ACK"), though if the monitoring service determines that the agent needs a change—such as a new version of a test configuration, a new configuration setting, etc.—the heartbeat response may include this data, provide an indication that the agent is to obtain the data (e.g., via passing a resource identifier such as a URL/URI), etc. The results of the heartbeat process (e.g., a date or time it was performed, a status of the heartbeat, etc.) may be stored in storage at block 822 and/or a summary thereof may be stored for subsequent heartbeat processes at block 836.

In some embodiments, the agent 112A includes an execution agent 810 that orchestrates the execution of the commands of the test configuration. The execution agent 810 may be invoked 812 on a periodic basis (e.g., every minute, every two minutes, every five minutes) or on a scheduled basis and read the test configuration from storage at block 814. At block 818 the agent 810 determines whether there are tests to be performed (e.g., by determining if sufficient time has passed since a previous execution of the commands, by determining whether commands exist within a test configuration, etc.); if not, the process may stop at 824 until the agent is again invoked. Otherwise, the tests may be performed at block 820, and the results thereof may be stored to storage at 822 before halting at block 824 until the agent is again invoked.

In some embodiments, the agent 112A includes a reporting agent 830 that may be periodically invoked or may detect a change at block 832 to the set of test configuration results (e.g., stored via block 822), and thereafter send one or more updates directly or indirectly to the monitoring service 102, such as by writing the results/raw metric data to a stream provided by a stream service. In some embodiments, metadata describing the attempted upload/writing of this data may be stored as a summary at block 836, and the agent 830 may halt until it is again invoked.

Figure 9:
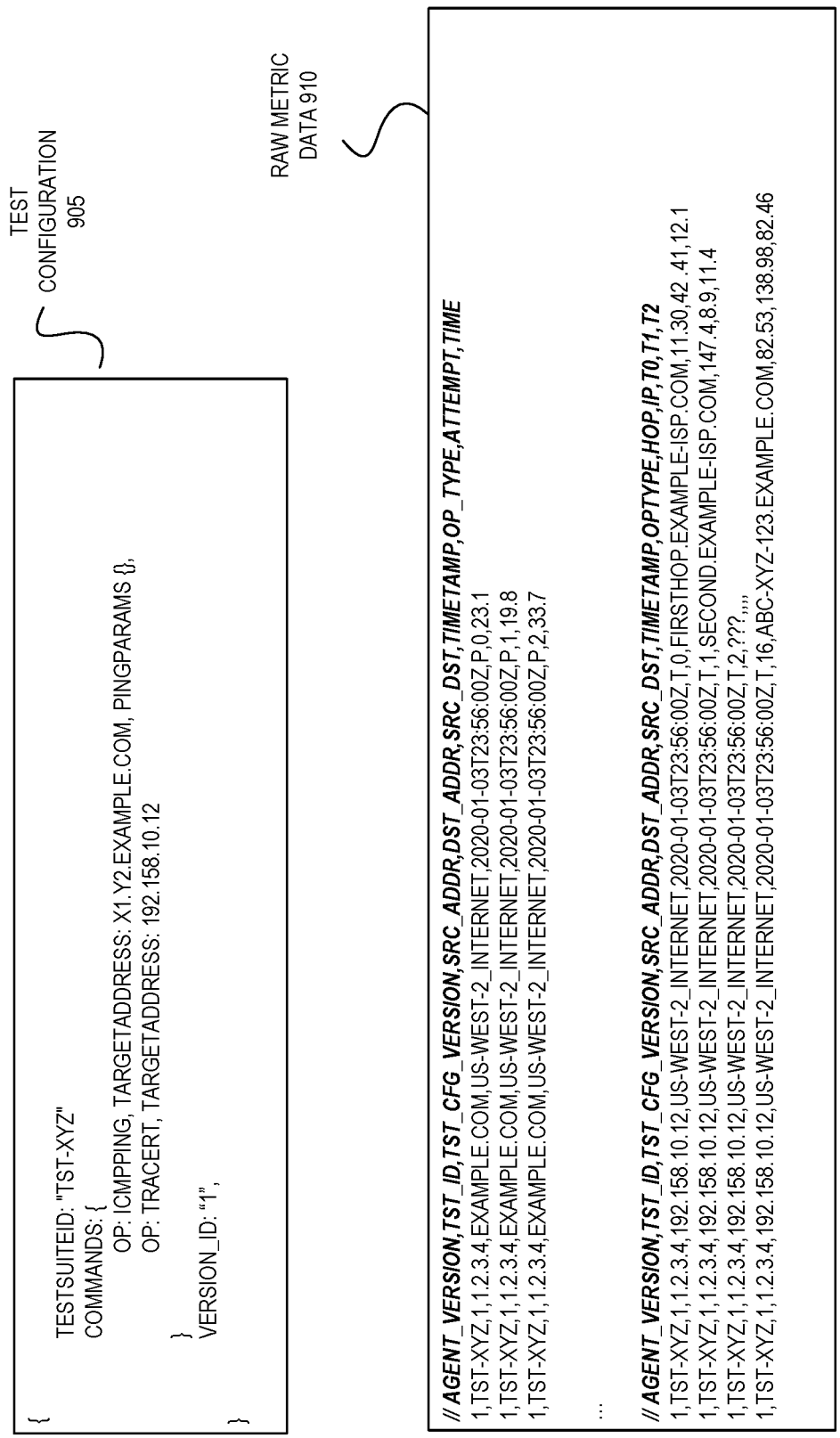
FIG. 9 is a diagram illustrating an exemplary test configuration and returned raw metric data resulting therefrom according to some embodiments.

For further clarity, FIG. 9 is a diagram illustrating an exemplary test configuration 905 and returned raw metric data 910 resulting therefrom according to some embodiments. As shown, a test configuration 905 (e.g., in JavaScript Object Notation (JSON) format) may be created from a test suite having a test suite identifier (here, "TST-XYZ"), a version identifier (here, version_ID of "1"), and one or more commands In this example, a first command is to perform an ICMP ping to a target resource at a network address (hostname) of X1.Y2.EXAMPLE.COM, and a second command is to perform a traceroute to a network address of 192.158.10.12. In various embodiments, these commands are performed using one or multiple networks, such as using each cellular network available to the test device.

The results from these executed commands are shown as part of raw metric data 910. The raw metric data 910 may be in a variety of formats; in this example, the results include a number of columns of data, such as an agent version identifier, a test configuration identifier, a test configuration version identifier, a source address (e.g., used by the agent), a destination address (e.g., of the target), a source location to destination location identifier, a timestamp of when the command was executed, an operation type (e.g., "P" for ping, "T" for traceroute, etc.), and one or more columns that may be different based on the type of operation. In this example, three results for the ping test include an attempt count identifier (e.g., 1, 2, 3) and a latency/time for the ping (e.g., 23.1 ms, 19.8 ms, 33.7 ms). For the results from the second traceroute command, the custom columns may include a hop number (of the traced route), a hostname or network address associated with the hop, and time t0, t1, and t2 values.

Figure 10:
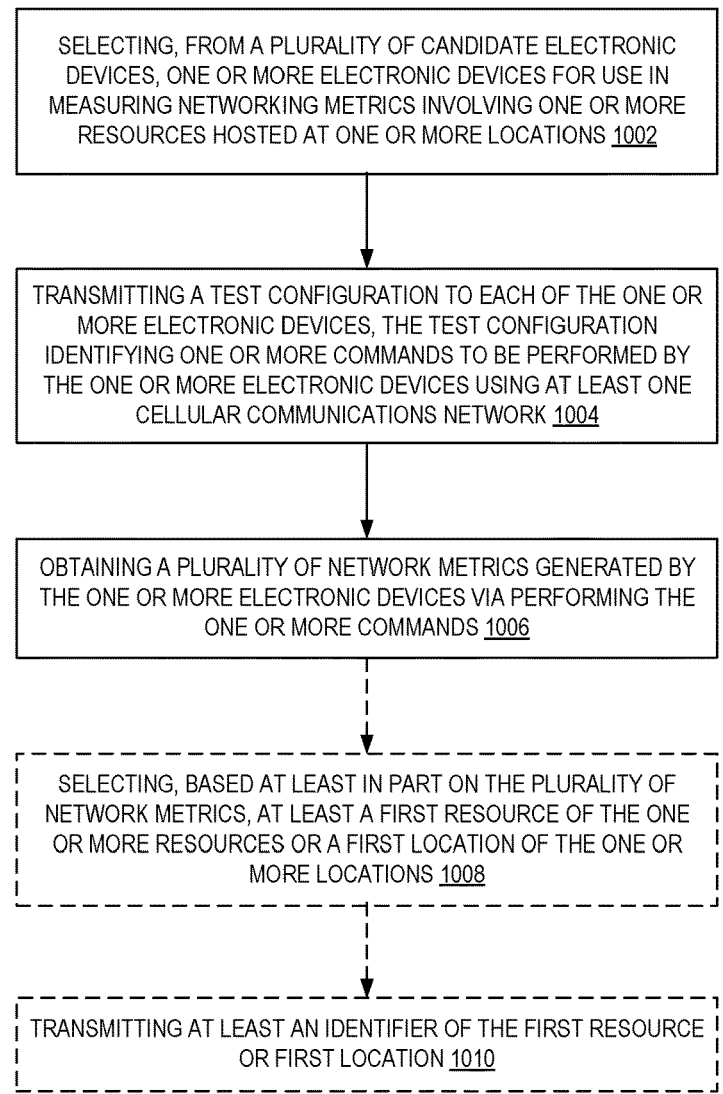
FIG. 10 is a flow diagram illustrating operations of a method performed in a service provider network for distributed network connectivity monitoring of provider network edge location resources from cellular networks according to some embodiments.

FIG. 10 is a flow diagram illustrating operations of a method performed in a service provider network for distributed network connectivity monitoring of provider network edge location resources from cellular networks according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by the provider network 100 (e.g., monitoring service 102 and optionally another service) of the other figures.

The operations 1000 include, at block 1002, selecting, from a plurality of candidate electronic devices, one or more electronic devices for use in measuring networking metrics involving one or more resources hosted at one or more locations.

The operations 1000 further include, at block 1004, transmitting a test configuration to each of the one or more electronic devices, the test configuration identifying one or more commands to be performed by the one or more electronic devices using at least one cellular communications network. In some embodiments, at least one of the one or more commands indicates that the one or more electronic devices are to perform a Transmission Control Protocol (TCP) ping, perform an Internet Control Message Protocol (ICMP) ping, perform a trace route, or transmit an HyperText Transfer Protocol (HTTP) GET method request.

The operations 1000 further include, at block 1006, obtaining a plurality of network metrics generated by the one or more electronic devices via performing the one or more commands In some embodiments, least a first network metric of the plurality of network metrics comprises a first measured latency between a first electronic device that generated the network metric and one of the one or more resources. In some embodiments, the first measured latency indicates the latency between the first electronic device and the one resource via a first cellular communications network; and a second network metric of the plurality of network metrics comprises a second measured latency between the first electronic device and the one resource via a second cellular communications network.

The operations 1000 further include, at block 1008, selecting, based at least in part on the plurality of network metrics, at least a first resource of the one or more resources or a first location of the one or more locations. In some embodiments, at least the first location of the one or more locations comprises an edge location of a service provider network that is deployed within a communications service provider network.

The operations 1000 further include, at block 1010, transmitting at least an identifier of the first resource or first location. In some embodiments, block 1010 comprises transmitting at least the identifier of the first resource or first location to a client electronic device of a user, causing at least the identifier of the first resource or first location to be presented to the user via a user interface, and wherein the method further comprises receiving a message originated by the client electronic device providing a user input made by the user via the user interface.

In some embodiments, the operations 1000 further include receiving a request for a network address associated with a host name, wherein the one or more resources comprise a plurality of resources that are all associated with the host name, wherein the selecting includes identifying the first resource as having a lowest predicted or actual latency of the plurality of resources to a target location associated with the request, and wherein the transmitting comprises transmitting a network address corresponding to the first resource.

In some embodiments, the operations 1000 further include receiving a request to deploy one or more computing resources, wherein the request is associated with a deployment preference indicating a latency characteristic required for the placement of individual ones or all of the one or more computing resources, wherein at least one of the one or more computing resources comprises a code segment, an application, a compute instance, or a container, wherein the selecting includes identifying the first location of the one or more locations as satisfying the latency characteristic for the placement of at least one or all of the one or more computing resources, and wherein the transmitting comprises transmitting first location to a service of a service provider network to cause at least one of the one or more computing resources to be launched at the first location.

In some embodiments, block 1008 comprises identifying, from one or more of the plurality of network metrics, that the first resource or first location was not reachable by at least a first electronic device of the one or more electronic devices; and the transmitting at least the identifier of the first resource or the first location of block 1010 indicates that the first resource or first location was not reachable.

In some embodiments, the operations 1000 further include obtaining at least one geographic coordinate corresponding to a location of a corresponding electronic device when it generated at least one of the plurality of metrics, wherein the selecting, based at least in part on the plurality of network metrics, at least the first resource of the one or more resources or the first location of the one or more locations is further based at least in part on the at least one geographic coordinate.

In some embodiments, the operations 1000 further include receiving a heartbeat message from a first electronic device of the one or more electronic devices, the heartbeat message identifying a first version of the test configuration that the first electronic device is utilizing; determining that the first electronic device is to utilize a second version of the test configuration; and transmitting, to the first electronic device, the second version of the test configuration.

Figure 11:
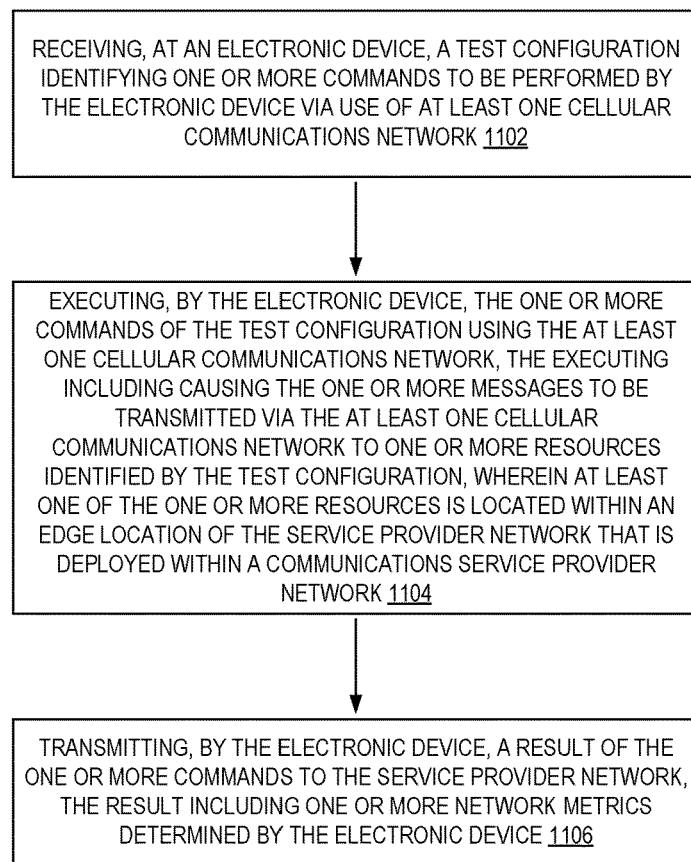
FIG. 11 is a flow diagram illustrating operations of a method for performed by one or more agents of a test device for distributed network connectivity monitoring of provider network edge location resources from cellular networks according to some embodiments.

FIG. 11 is a flow diagram illustrating operations of a method for performed by one or more agents of a test device for distributed network connectivity monitoring of provider network edge location resources from cellular networks according to some embodiments. Some or all of the operations 1100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1100 are performed by an agent 112 of the other figures.

The operations 1100 include, at block 1102, receiving, at an electronic device (e.g., from a controller of a service provider network), a test configuration identifying one or more commands to be performed by the electronic device via use of at least one cellular communications network.

The operations 1100 further include, at block 1104, executing, by the electronic device, the one or more commands of the test configuration using the at least one cellular communications network, the executing including causing the one or more messages to be transmitted via the at least one cellular communications network to one or more resources identified by the test configuration, wherein at least one of the one or more resources is located within an edge location of the service provider network that is deployed within a communications service provider network. In some embodiments, causing the one or more messages to be transmitted via the at least one cellular communications network comprises transmitting the one or more messages via a wired or wireless link to a second electronic device that includes a physical cellular communications interface, wherein the second electronic device transmits the one or more messages via the at least one cellular communications network.

In some embodiments, block 1104 comprises transmitting a first message via a first cellular communications network to a first resource identified by the test configuration and transmitting a second message via a second cellular communications network to the first resource.

The operations 1100 further include, at block 1106, transmitting, by the electronic device, a result of the one or more commands to the service provider network, the result including one or more network metrics determined by the electronic device.

In some embodiments, the result further includes one or more of an identifier of a software agent executed by the electronic device, an identifier of the test configuration, or a time when one or more of the commands were executed.

In some embodiments, the result further includes one or more geographic coordinates indicating a location of the electronic device when one or more of the commands were executed.

In some embodiments, block 1106 includes transmitting a plurality of results, including the result, to the service provider network, wherein the plurality of results correspond to a plurality of executions of the test configuration.

In some embodiments, the operations 1100 further include transmitting, by the electronic device, a heartbeat message to the controller, the heartbeat message including at least an identifier of a version of the test configuration utilized by the electronic device; and receiving, by the electronic device, a heartbeat response message originated by the controller. In some embodiments, the heartbeat message includes a second test configuration to be used by the electronic device, the method further comprising storing the second test configuration to a storage location of the electronic device.

In some embodiments, the test configuration is received using a wireless local access network (WLAN) interface or an Ethernet interface of the electronic device; or the transmitting, by the electronic device, of the result occurs using the WLAN interface or the Ethernet interface.

In some embodiments, the operations 1100 further include detecting, by the electronic device, an attempt to physically tamper with the electronic device; and destroying a set of one or more keys used for decrypting at least a portion of data stored by the electronic device.

In some embodiments, the electronic device is a mobile device that is at least partially battery-powered.

Figure 12:
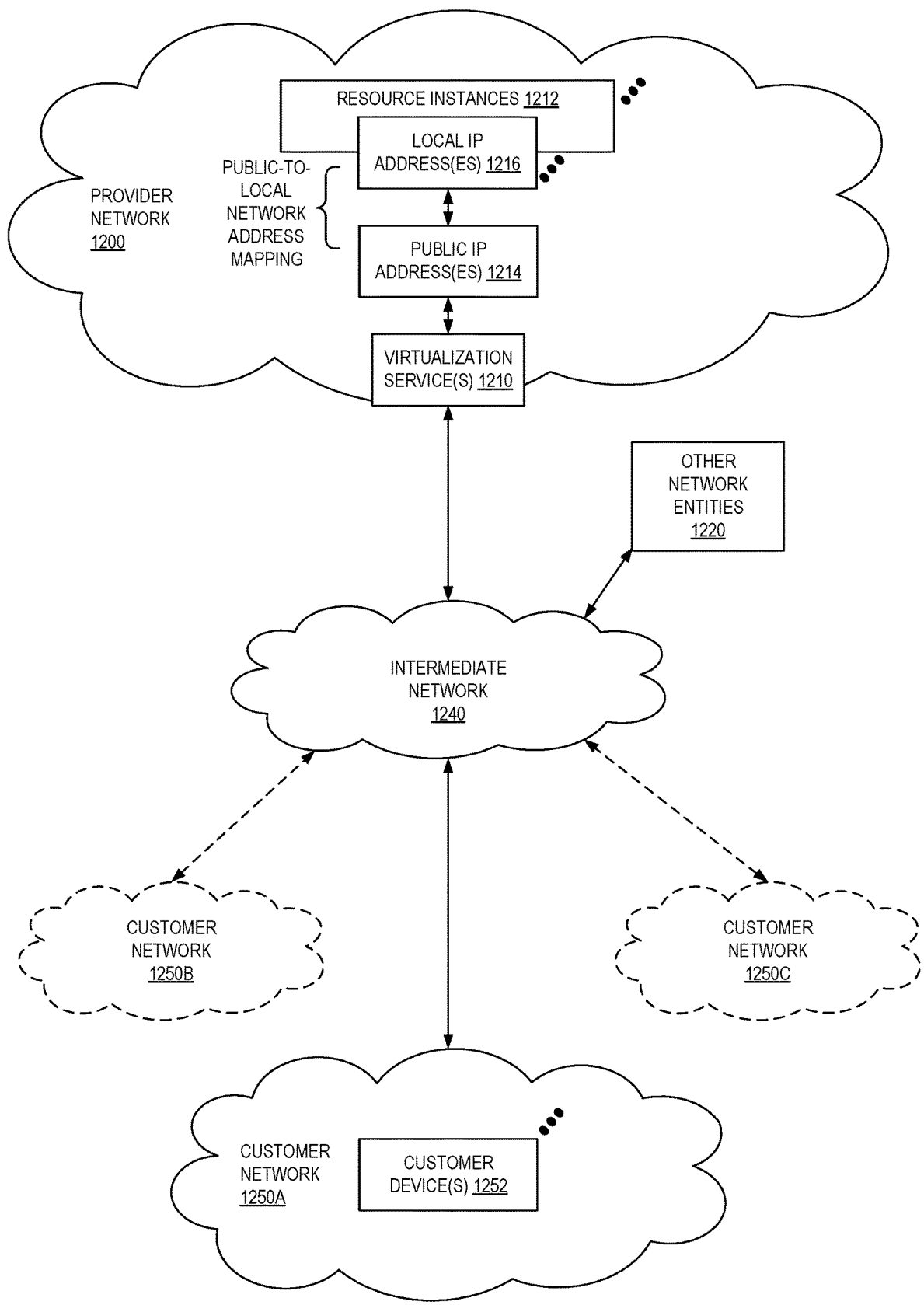
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
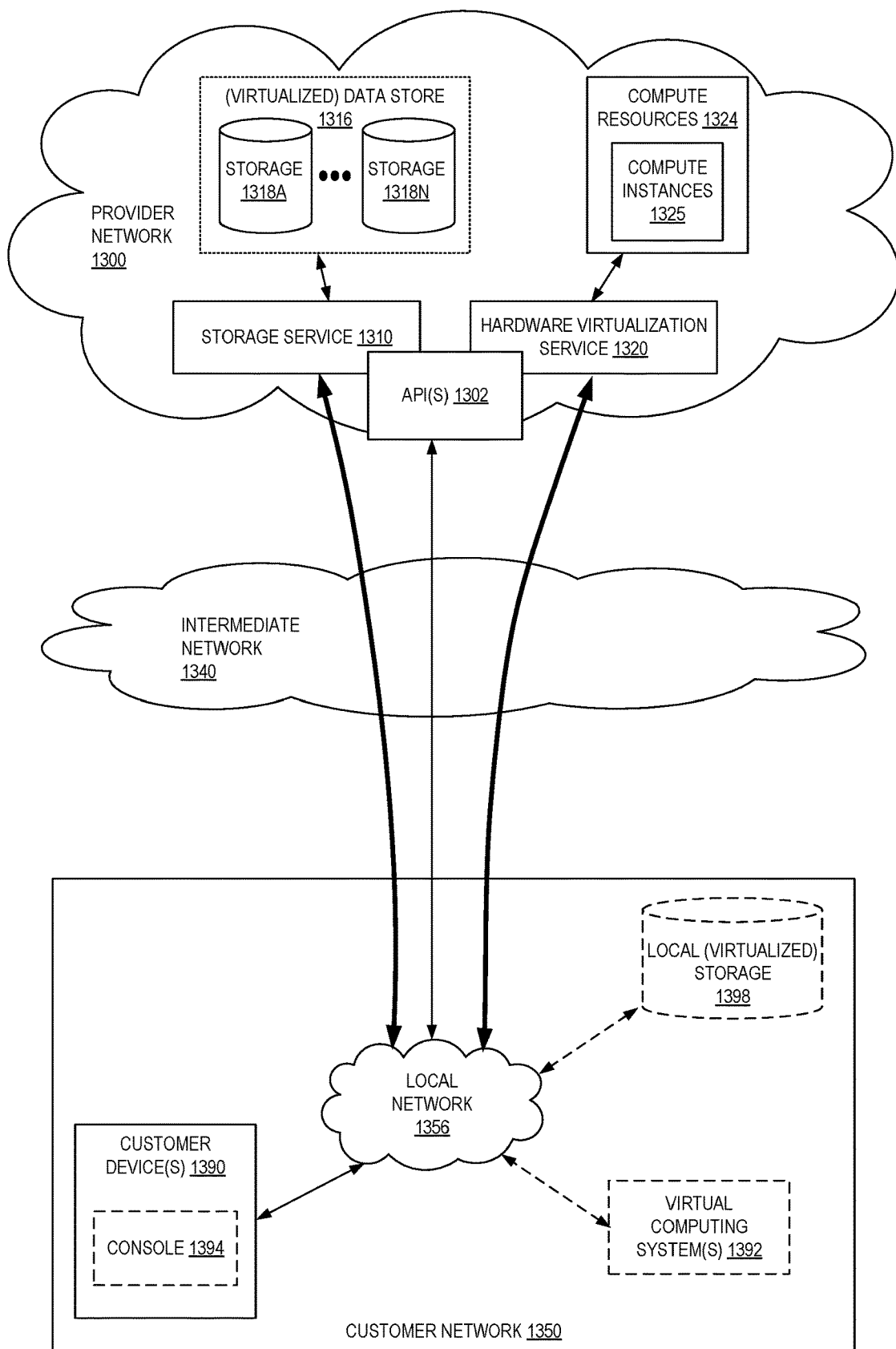
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple compute resources 1324 (e.g., compute instances 1325 such as VMs) to customers. The compute resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the compute resources 1324 to public Internet destinations, and from public Internet sources to the local IP addresses of compute resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative Systems

Figure 14:
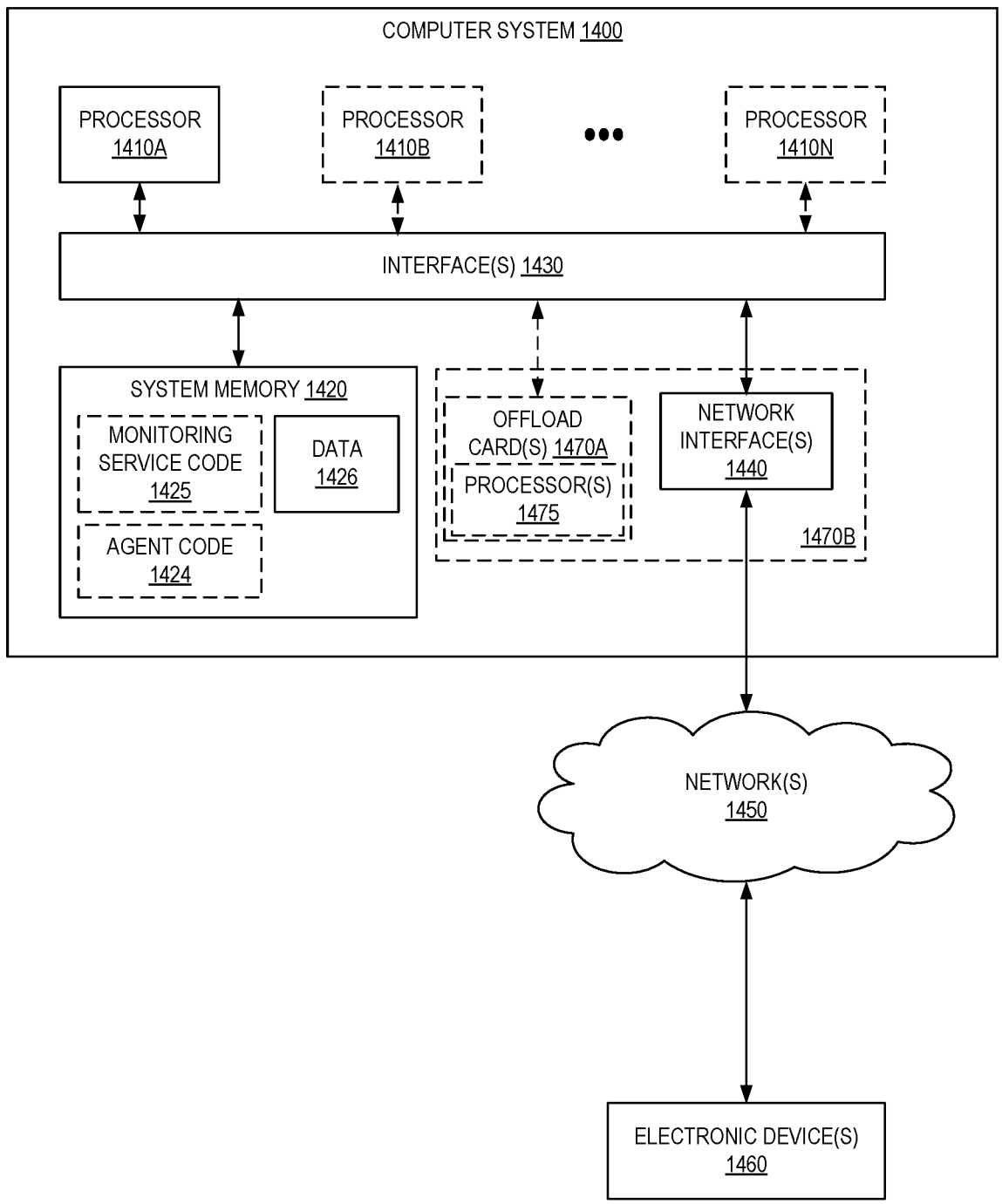
FIG. 14 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as monitoring service code 1425 (e.g., executable to implement, in whole or in part, the monitoring service 102) and/or agent code 1424 (e.g., executable to implement, in whole or in part, an agent 112), and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470A/1470B (including one or more processors 1475, and possibly including the one or more network interfaces 1440) that are connected using an I/O interface 1430 (e.g., a bus implementing a version of the Peripheral Component Interconnect—Express (PCI-E) standard, or another interconnect such as a QuickPath interconnect (QPI) or UltraPath interconnect (UPI), USB, etc.). For example, in some embodiments the computer system 1400 may act as a host electronic device (e.g., operating as part of a hardware virtualization service) that hosts compute resources such as compute instances, and the one or more offload cards 1470A/1470B execute a virtualization manager that can manage compute instances that execute on the host electronic device. As an example, in some embodiments the offload card(s) 1470A/1470B can perform compute instance management operations such as pausing and/or un-pausing compute instances, launching and/or terminating compute instances, performing memory transfer/copying operations, etc. These management operations may, in some embodiments, be performed by the offload card(s) 1470A/1470B in coordination with a hypervisor (e.g., upon a request from a hypervisor) that is executed by the other processors 1410A-1410N of the computer system 1400. However, in some embodiments the virtualization manager implemented by the offload card(s) 1470A/1470B can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1318A-1318N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   identifying, among a plurality of candidate electronic devices, an electronic device for use in measuring networking metrics involving resources hosted across different locations within physical infrastructure of a cellular communications network;
   transmitting a test configuration to the electronic device, the test configuration identifying a command to be performed by the electronic device, using the cellular communications network, to test characteristics of network connectivity to the resources;
   obtaining network metrics generated by the electronic device via performing the command;
   receiving, within a service provider network, a request to launch a compute instance;
   selecting, based at least in part on the network metrics, one of the different locations for the compute instance; and
   causing the compute instance to be launched at the selected location.

2. The computer-implemented method of claim 1, wherein the selected location comprises an edge location of the service provider network.

3. The computer-implemented method of claim 1, wherein the network metrics include:
   a first network metric generated by a first electronic device via use of the cellular communications network to interact with a first resource; and
   a second network metric generated by the first electronic device via use of a second cellular communications network to interact with the first resource.

4. A computer-implemented method comprising:
   identifying, among a plurality of candidate electronic devices, a first electronic device for use in measuring networking metrics involving resources hosted at one or more locations;
   transmitting a test configuration to the first electronic device, the test configuration identifying a command to be performed by the first electronic device using a cellular communications network;
   obtaining a network metric generated by the first electronic device via performing the command;
   selecting, based at least in part on the network metric, at least a first resource of the resources or a first location of the one or more locations; and
   transmitting at least an identifier of the first resource or the first location.

5. The computer-implemented method of claim 4, further comprising:
   receiving a request for a network address associated with a host name, wherein the resources comprise a plurality of resources that are all associated with the host name,
   wherein the selecting includes identifying the first resource as having a lowest predicted or actual latency of the plurality of resources to a target location associated with the request, and
   wherein the transmitting comprises transmitting a network address corresponding to the first resource.

6. The computer-implemented method of claim 4, further comprising:
   receiving a request to deploy a computing resource, wherein the request is associated with a deployment preference indicating a latency characteristic required for placement of the computing resource,
   wherein the computing resource comprises at least one of a code segment, an application, a compute instance, or a container,
   wherein the selecting includes identifying the first location as satisfying the latency characteristic for placement of the computing resource, and
   wherein the transmitting comprises transmitting the identifier of the first location to a service of a service provider network to cause the computing resource to be deployed at the first location.

7. The computer-implemented method of claim 4, wherein the first location comprises an edge location of a service provider network that is deployed within physical infrastructure of the cellular communications network.

8. The computer-implemented method of claim 4, wherein the command indicates that the first electronic device is to:
   perform a Transmission Control Protocol (TCP) ping;
   perform an Internet Control Message Protocol (ICMP) ping;
   perform a trace route;
   transmit a HyperText Transfer Protocol (HTTP) request;
   perform a Domain Name Service (DNS) lookup; or
   receive a User Datagram Protocol (UDP) multimedia stream.

9. The computer-implemented method of claim 4, wherein the network metric comprises a first measured latency between the first electronic device and the first resource.

10. The computer-implemented method of claim 9, wherein:
    the first measured latency indicates the latency between the first electronic device and the first resource via the cellular communications network; and
    the network metric further comprises a second measured latency between the first electronic device and the first resource via a second cellular communications network.

11. The computer-implemented method of claim 4, wherein:
    the selecting, based at least in part on the network metric, at least the first resource or the first location comprises determining, based on the network metric, that the first resource or the first location was not reachable by the first electronic device; and
    the transmitting at least the identifier of the first resource or the first location indicates that the first resource or the first location was not reachable.

12. The computer-implemented method of claim 4, further comprising:
    obtaining a geographic coordinate corresponding to a location of a corresponding electronic device when it generated at least one of the metrics, wherein the selecting, based at least in part on the network metric, at least the first resource or the first location is further based at least in part on the geographic coordinate.

13. The computer-implemented method of claim 4, wherein transmitting at least the identifier of the first resource or the first location comprises transmitting at least the identifier of the first resource or the first location to a client electronic device of a user, causing at least the identifier of the first resource or the first location to be presented to the user via a user interface, and wherein the method further comprises receiving a message originated by the client electronic device providing a user input made by the user via the user interface.

14. The computer-implemented method of claim 4, further comprising:
- receiving a heartbeat message from the first electronic device, the heartbeat message identifying a first version of the test configuration that the first electronic device is utilizing;
- determining that the first electronic device is to utilize a second version of the test configuration; and
- transmitting, to the first electronic device, the second version of the test configuration.

15. A system comprising:
- a first one or more electronic devices to implement a first service in a multi-tenant provider network, the first service including instructions that upon execution cause the first service to:
  - select, from a plurality of candidate electronic devices, a first electronic device for use in measuring networking metrics involving resources hosted at one or more locations;
  - transmit a test configuration to the first electronic devices, the test configuration identifying a command to be performed by the first electronic device using a cellular communications network;
  - obtain network metrics generated by the first electronic device via performing the command; and
  - transmit data based on or including the network metrics to a second service; and
- a second one or more electronic devices to implement the second service in the multi-tenant provider network, the second service to:
  - receive the data from the first service;
  - select, based at least in part on the data, a first resource of the resources or a first location of the one or more locations; and
  - transmit a message identifying the first resource or the first location.

16. The system of claim 15, wherein the second service is further to:
- receive a request for a network address associated with a host name, wherein the resources comprise a plurality of resources that are all associated with the host name,
- wherein the selection includes an identification of the first resource as having a lowest predicted or actual latency of the resources to a target location associated with the request, and
- wherein the transmitted message includes a network address corresponding to the first resource.

17. The system of claim 15, wherein the second service is further to:
- receive a request to deploy a computing resource, wherein the request is associated with a deployment preference indicating a latency characteristic required for placement of the computing resource,
- wherein the computing resource comprises at least one of a code segment, an application, a compute instance, or a container,
- wherein the selection includes an identification of the first location as satisfying the latency characteristic for placement of the computing resource, and
- wherein the transmitted message is to cause at the computing resource to be deployed at the first location.

18. The system of claim 15, wherein the first location comprises an edge location of the multi-tenant provider network that is deployed within physical infrastructure of the cellular communications network.

19. The system of claim 15, wherein the command indicates that the first electronic device is to:
- perform a Transmission Control Protocol (TCP) ping;
- perform an Internet Control Message Protocol (ICMP) ping;
- perform a trace route; or
- transmit an HyperText Transfer Protocol (HTTP) GET method request message.

20. The system of claim 15, further comprising instructions that when executed by the second service cause the second service to:
- receive a heartbeat message from the first electronic device, the heartbeat message identifying a first version of the test configuration that the first electronic device is utilizing;
- determine that the first electronic device is to utilize a second version of the test configuration; and
- transmit, to the first electronic device, the second version of the test configuration.

\* \* \* \* \*